US012647216B2

(12) United States Patent
Park et al.

(10) Patent No.: US 12,647,216 B2
(45) Date of Patent: Jun. 2, 2026

(54) METHOD FOR TERMINAL TO EVALUATE VALIDITY OF HARQ PROCESS AND DEVICE FOR SAME IN WIRELESS COMMUNICATION SYSTEM

(71) Applicant: LG ELECTRONICS INC., Seoul (KR)

(72) Inventors: Haewook Park, Seoul (KR); Suckchel Yang, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 318 days.

(21) Appl. No.: 18/261,654

(22) PCT Filed: Jan. 17, 2022

(86) PCT No.: PCT/KR2022/000818
§ 371 (c)(1),
(2) Date: Jul. 14, 2023

(87) PCT Pub. No.: WO2022/154615
PCT Pub. Date: Jul. 21, 2022

(65) Prior Publication Data
US 2024/0305415 A1 Sep. 12, 2024

(30) Foreign Application Priority Data
Jan. 15, 2021 (KR) ........................ 10-2021-0006338

(51) Int. Cl.
*H04L 1/1829* (2023.01)
*H04L 1/1812* (2023.01)
(52) U.S. Cl.
CPC .......... *H04L 1/1854* (2013.01); *H04L 1/1812* (2013.01)

(58) Field of Classification Search
None
See application file for complete search history.

(56) References Cited

U.S. PATENT DOCUMENTS

2021/0029719 A1* 1/2021 Zhou ..................... H04L 5/0053
2022/0247520 A1* 8/2022 Zhang .................. H04L 1/1854
(Continued)

FOREIGN PATENT DOCUMENTS

| KR | 1020130126593 | 11/2013 |
| KR | 101749346 | 6/2017 |
| WO | 2020092126 | 5/2020 |

OTHER PUBLICATIONS

CATT, "HARQ operation enhancement for NTN", Oct. 26-Nov. 13, 2020, 3GPP TSG RAN WG1 #103-e (R1-2007856), pp. 1-7.*
(Continued)

*Primary Examiner* — Steve R Young
(74) *Attorney, Agent, or Firm* — LEE, HONG, DEGERMAN, KANG & WAIMEY

(57) ABSTRACT

Disclosed are a method for a terminal to transmit a feedback signal and a device for same in a wireless communication system according to various embodiments. The method comprises the steps of: receiving a first signal for scheduling a physical downlink shared channel (PDSCH); and determining whether to transmit the feedback signal related to a first signal, wherein the feedback signal is transmitted on the basis that the first signal includes control information for the activation or release of a semi-persistent scheduling (SPS) PDSCH, regardless of whether a hybrid physical downlink shared channel (HARQ) process for the PDSCH is disabled.

6 Claims, 14 Drawing Sheets

DL assingment-to-PDSCH offset (K0)          UL grant-to-PUSCH offset (K2)

PDSCH-to-HARQ-ACK reporting offset (K1)

(56) References Cited

U.S. PATENT DOCUMENTS

2022/0361231 A1* 11/2022 Oh ......................... H04L 1/189
2023/0397196 A1* 12/2023 Nishio ................. H04L 5/0094

OTHER PUBLICATIONS

European Patent Office Application Serial No. 22739807.0, Search Report dated Oct. 21, 2024, 8 pages.
CATT, "HARQ operation enhancement for NTN," 3GPP TSG RAN WG1 #103-e, R1-2007856, Nov. 2020, 7 pages.
Qualcomm Incorporated, "Enhancements on HARQ for NTN," 3GPP TSG RAN WG1 #103-e, R1-2009264, Nov. 2020, 6 pages.
Sony, "Consideration on delay-tolerant HARQ for NTN," 3GPP TSG RAN WG1 Meeting #98, R1-1908776, Aug. 2019, 5 pages.
PCT International Application No. PCT/KR2022/000818, International Search Report dated May 20, 2022, 6 pages.
ZTE, "Summary of AI 8.4.3 for HARQ for NTN," 3GPP TSG RAN WG1 #103e-E, R1-2009420, Nov. 2020, 31 pages.
Huawei, "Correction of NRU HARQ procedure in the presence of SPS PDSCH," 3GPP TSG-RAN WG1 Meeting #103-e, R1-2009611, Nov. 2020, 2 pages.

* cited by examiner (a) Example of PDSCH time domain resource allocation (b) Example of PUSCH time domain resource allocation (a)

(b)

(a)

(b)

- Common TA (Tcom) = 2*D0/c
- UE specific differential TA for xth UE (TUEx) = 2*(D1x-D0)/c
- Full TA (Tfull) = Tcom+TUEx (a) Regenerative payload

- Common TA (Tcom) = 2*(D01+D02)/c
- UE specific differential TA for xth UE (TUEx) = 2*(D1x-D01)/c
- Full TA (Tfull) = Tcom+TUEx (b) Transparent payload Start M41 — Receiving scheduling information for a first PDSCH M43 — Receiving scheduling information for a second PDSCH M45 — Performing a HARQ OOO check End

BS

UE

Configuration information — M105

Control information — M110

DL data — M115

Feedback — M120

Device(100, 200)

METHOD FOR TERMINAL TO EVALUATE VALIDITY OF HARQ PROCESS AND DEVICE FOR SAME IN WIRELESS COMMUNICATION SYSTEM

CROSS-REFERENCE TO RELATED APPLICATION(S)

This application is the National Stage filing under 35 U.S.C. 371 of International Application No. PCT/KR2022/000818, filed on Jan. 17, 2022, which claims the benefit of earlier filing date and right of priority to Korean Application No. 10-2021-0006338, filed on Jan. 15, 2021, the contents of which are all incorporated by reference herein in their entirety.

TECHNICAL FIELD

The present disclosure relates to a method for a user equipment (UE) to evaluate the effectiveness of a hybrid automatic repeat request (HARQ) process in a wireless communication system and apparatus therefor.

BACKGROUND

Wireless communication systems have been widely deployed to provide various types of communication services such as voice or data. In general, a wireless communication system is a multiple access system that supports communication of multiple users by sharing available system resources (a bandwidth, transmission power, etc.). Examples of multiple access systems include a code division multiple access (CDMA) system, a frequency division multiple access (FDMA) system, a time division multiple access (TDMA) system, an orthogonal frequency division multiple access (OFDMA) system, a single carrier frequency division multiple access (SC-FDMA) system, and a multi carrier frequency division multiple access (MC-FDMA) system.

As more and more communication devices require larger communication capacities in transmitting and receiving signals, there is a need for mobile broadband communication improved from the legacy radio access technology. Accordingly, communication systems considering services/UEs sensitive to reliability and latency are under discussion. A next-generation radio access technology in consideration of enhanced mobile broadband communication, massive Machine Type Communication (MTC), and Ultra-Reliable and Low Latency Communication (URLLC) may be referred to as new radio access technology (RAT) or new radio (NR).

SUMMARY

The present disclosure is to provide a method and apparatus for resolving ambiguity that may occur in effectiveness evaluation. Specifically, in determining the effectiveness of constraint on hybrid automatic repeat request (HARQ) feedback timings (i.e., HARQ out-of-order (OOO)), a separate virtual feedback transmission timing may be defined for one physical downlink shared channel (PDSCH) having a disabled HARQ process configured therefor where no feedback transmission timing is specified, thereby resolving the ambiguity.

It will be appreciated by those of ordinary skill in the art to which the embodiment(s) pertain that the objects that could be achieved with the embodiment(s) are not limited to what has been particularly described hereinabove and the above and other objects will be more clearly understood from the following detailed description.

In an aspect of the present disclosure, there is provided a method of evaluating, by a user equipment (UE), effectiveness of a hybrid automatic repeat request (HARQ) process in a wireless communication system. The method may include: receiving first downlink control information (DCI) scheduling a first physical downlink shared channel (PDSCH); receiving second DCI scheduling a second PDSCH; and evaluating the effectiveness of the HARQ process based on a feedback transmission timing for each of the first PDSCH and the second PDSCH. The first PDSCH and the second PDSCH may be configured with different HARQ process identifications (IDs). Based on that the HARQ process for one of the first PDSCH and the second PDSCH is disabled, the UE may be configured to evaluate the effectiveness by configuring a virtual feedback transmission timing for the one PDSCH.

Alternatively, the virtual feedback transmission timing may be configured based on a specific value included in the DCI scheduling the one PDSCH.

Alternatively, the specific value may be obtained from at least one of a K1 field, a new data indicator (NDI) field, a redundancy version (RV) field, or a field defined for the virtual feedback transmission timing in the DCI related to the disabled HARQ process Alternatively, the virtual feedback transmission timing may be configured based on a maximum or minimum value among a plurality of K1 values configured for the UE.

Alternatively, the virtual feedback transmission timing may be configured based on a timing offset related to a processing time reported as capability information on the UE.

Alternatively, the virtual feedback transmission timing may be configured based on a timing offset configured by a base station based on capability information reported by the UE.

Alternatively, based on that the one PDSCH is the second PDSCH, the effectiveness evaluation may be performed based on whether the virtual feedback transmission timing for the second PDSCH is earlier than the feedback signal transmission timing for the first PDSCH.

Alternatively, based on the virtual feedback transmission timing is earlier than the feedback transmission timing, the UE may be configured to determine that scheduling of the first PDSCH and the second PDSCH is invalid.

Alternatively, the first DCI and the second DCI may schedule the first PDSCH related to a non-terrestrial network (NTN) and the second PDSCH related to the NTN, respectively.

In another aspect of the present disclosure, there is provided a method of scheduling, by a base station, a first PDSCH and a second PDSCH in a wireless communication system. The method may include: transmitting first DCI scheduling the first PDSCH; and transmitting second DCI scheduling the second PDSCH. The first PDSCH and the second PDSCH may be configured with different HARQ process IDs. Based on that a HARQ process for the second PDSCH is disabled, the first PDSCH and the second PDSCH may be scheduled such that a virtual feedback transmission timing for the second PDSCH is not earlier than a feedback transmission timing for the first PDSCH.

In another aspect of the present disclosure, there is provided a UE configured to evaluate effectiveness of a HARQ process in a wireless communication system. The UE may include: a radio frequency (RF) transceiver; and a processor connected to the RF transceiver. The processor may be configured to: control the RF transceiver to receive first DCI scheduling a first PDSCH: control the RF transceiver to receive second DCI scheduling a second PDSCH; and evaluate the effectiveness of the HARQ process based on a feedback transmission timing for each of the first PDSCH and the second PDSCH. The first PDSCH and the second PDSCH may be configured with different HARQ process IDs. Based on that the HARQ process for one of the first PDSCH and the second PDSCH is disabled, the processor may be configured to evaluate the effectiveness by configuring a virtual feedback transmission timing for the one PDSCH.

In another aspect of the present disclosure, there is provided a base station configured to schedule a first PDSCH and a second PDSCH in a wireless communication system. The base station may include: an RF transceiver; and a processor connected to the RF transceiver. The processor may be configured to control the RF transceiver to: transmit first DCI scheduling the first PDSCH; and transmit second DCI scheduling the second PDSCH. The first PDSCH and the second PDSCH may be configured with different HARQ process IDs. Based on that a HARQ process for the second PDSCH is disabled, the first PDSCH and the second PDSCH may be scheduled such that a virtual feedback transmission timing for the second PDSCH is not earlier than a feedback transmission timing for the first PDSCH.

In another aspect of the present disclosure, there is provided a chipset configured to evaluate effectiveness of a HARQ process in a wireless communication system. The chipset may include: at least one processor; and at least one memory operably connected to the at least one processor and configured to, when executed, cause the at least one processor to perform operations. The operations may include: receiving first DCI scheduling a first PDSCH; receiving second DCI scheduling a second PDSCH; evaluating the effectiveness of the HARQ process based on a feedback signal transmission timing for each of the first PDSCH and the second PDSCH; and based on that the HARQ process for one of the first PDSCH and the second PDSCH is disabled, evaluating the effectiveness by configuring a virtual feedback transmission timing for the one PDSCH. The first PDSCH and the second PDSCH may be configured with different HARQ process IDs.

In a further of the present disclosure, there is provided a computer-readable storage medium including at least one computer program configured to perform operations for evaluating effectiveness of a HARQ process in a wireless communication system. The at least one computer program may be configured to cause at least one processor to perform the operations for evaluating the effectiveness, and the at least one computer program may be stored on the computer-readable storage medium. The operations may include: receiving first DCI scheduling a first PDSCH: receiving second DCI scheduling a second PDSCH; evaluating the effectiveness of the HARQ process based on a feedback signal transmission timing for each of the first PDSCH and the second PDSCH; and based on that the HARQ process for one of the first PDSCH and the second PDSCH is disabled, evaluating the effectiveness by configuring a virtual feedback transmission timing for the one PDSCH. The first PDSCH and the second PDSCH may be configured with different HARQ process IDs.

According to various embodiments, in determining the effectiveness of constraint on hybrid automatic repeat request (HARQ) feedback timings (i.e., HARQ out-of-order (OOO)), a separate virtual feedback transmission timing may be defined for one physical downlink shared channel (PDSCH) having a disabled HARQ process configured therefor where no feedback transmission timing is specified, thereby resolving ambiguity that may occur in the effectiveness determination.

In addition, when there is no constraint on HARQ feedback timings (i.e., HARQ OOO), if scheduling information for scheduling two PDSCHs is received within a predetermined specific offset, effective PDSCH scheduling may be selected in consideration of the reception timings of the scheduling information scheduling the two PDSCHs or the scheduling timings of the two PDSCHs, thereby minimizing unnecessary waste of resources.

Effects to be achieved by embodiment(s) are not limited to what has been particularly described hereinabove and other effects not mentioned herein will be more clearly understood by persons skilled in the art to which embodiment(s) pertain from the following detailed description.

BRIEF DESCRIPTION OF THE DRAWINGS

The accompanying drawings, which are included to provide a further understanding of the disclosure and are incorporated in and constitute a part of this application, illustrate embodiments of the disclosure and together with the description serve to explain the principle of the disclosure.

DETAILED DESCRIPTION

Figure 1:
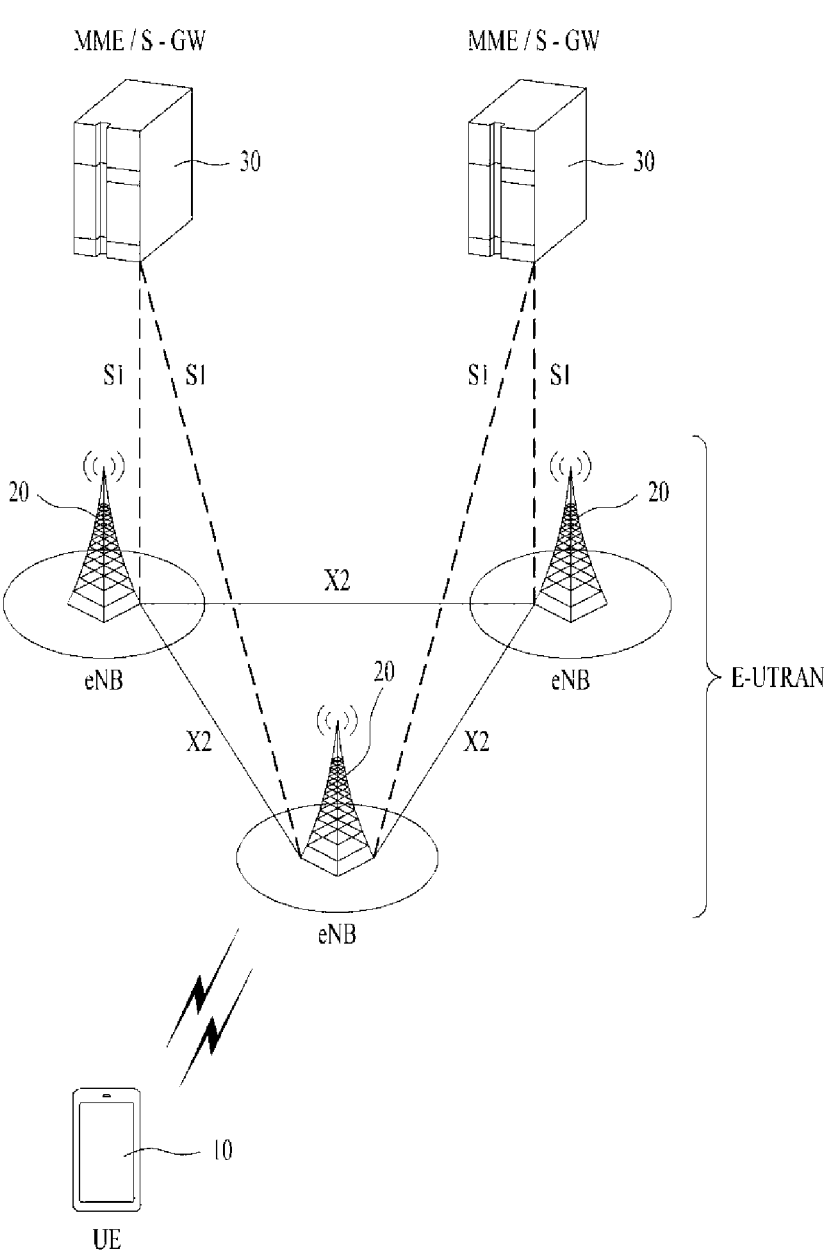
FIG. 1 illustrates the structure of an LTE system to which embodiment(s) are applicable.

The wireless communication system is a multiple access system that supports communication with multiple users by sharing available system resources (e.g., bandwidth, transmission power, etc.). Examples of the multiple access system include a code division multiple access (CDMA) system, a frequency division multiple access (FDMA) system, a time division multiple access (TDMA) system, an orthogonal frequency division multiple access (OFDMA) system, a single carrier frequency (SC-FDMA) system, a multi carrier frequency division multiple access (MC-FDMA) system, and the like.

A sidelink refers to a communication scheme in which a direct link is established between user equipments (UEs) to directly exchange voice or data between UEs without assistance from a base station (BS). The sidelink is being considered as one way to address the burden on the BS caused by rapidly increasing data traffic.

Vehicle-to-everything (V2X) refers to a communication technology for exchanging information with other vehicles, pedestrians, and infrastructure-built objects through wired/wireless communication. V2X may be divided into four types: vehicle-to-vehicle (V2V), vehicle-to-infrastructure (V2I), vehicle-to-network (V2N), and vehicle-to-pedestrian (V2P). V2X communication may be provided through a PC5 interface and/or a Uu interface.

As more and more communication devices require larger communication capacities in transmitting and receiving signals, there is a need for mobile broadband communication improved from the legacy radio access technology. Accordingly, communication systems considering services/UEs sensitive to reliability and latency are under discussion. A next-generation radio access technology in consideration of enhanced mobile broadband communication, massive MTC, and Ultra-Reliable and Low Latency Communication (URLLC) may be referred to as new radio access technology (RAT) or new radio (NR). Even in NR, V2X communication may be supported.

Techniques described herein may be used in various wireless access systems such as code division multiple access (CDMA), frequency division multiple access (FDMA), time division multiple access (TDMA), orthogonal frequency division multiple access (OFDMA), single carrier-frequency division multiple access (SC-FDMA), etc. CDMA may be implemented as a radio technology such as universal terrestrial radio access (UTRA) or CDMA2000. TDMA may be implemented as a radio technology such as global system for mobile communications (GSM)/general packet radio service (GPRS)/Enhanced Data Rates for GSM Evolution (EDGE). OFDMA may be implemented as a radio technology such as IEEE 802.11 (Wi-Fi), IEEE 802.16 (WiMAX), IEEE 802.20, evolved-UTRA (E-UTRA) etc. UTRA is a part of universal mobile telecommunications system (UMTS). 3GPP LTE is a part of Evolved UMTS (E-UMTS) using E-UTRA. 3GPP LTE employs OFDMA for downlink and SC-FDMA for uplink. LTE-A is an evolution of 3GPP LTE. 3GPP NR (New Radio or New Radio Access Technology) is an evolved version of 3GPP LTE/LTE-A/LTE-A pro.

5G NR is a successor technology of LTE-A and is a new clean-slate mobile communication system with characteristics such as high performance, low latency, and high availability. 5G NR may utilize all available spectrum resources, from low frequency bands below 1 GHz to intermediate frequency bands from 1 GHz to 10 GHz and high frequency (millimeter wave) bands above 24 GHz.

For clarity of explanation, LTE-A or 5G NR is mainly described, but the technical spirit of the embodiment(s) is not limited thereto FIG. 1 illustrates the structure of an LTE system to which the present disclosure is applicable. This may also be called an evolved UMTS terrestrial radio access network (E-UTRAN) or LTE/LTE-A system.

Referring to FIG. 1, the E-UTRAN includes evolved Node Bs (eNBs) 20 which provide a control plane and a user plane to UEs 10. A UE 10 may be fixed or mobile and may also be referred to as a mobile station (MS), user terminal (UT), subscriber station (SS), mobile terminal (MT), or wireless device. An eNB 20 is a fixed station communication with the UE 10 and may also be referred to as a base station (BS), a base transceiver system (BTS), or an access point.

The eNBs 20 may be connected to each other via an X2 interface. The eNB 20 is connected to an evolved packet core (EPC) 39 via an S1 interface. More specifically, the eNB 20 is connected to a mobility management entity (MME) via an S1-MME interface and to a serving gateway (S-GW) via an S1-U interface.

The EPC 30 includes an MME, an S-GW, and a packet data network-gateway (P-GW). The MME has access information or capability information about UEs, which are mainly used for mobility management of the UEs. The S-GW is a gateway having the E-UTRAN as an end point, and the P-GW is a gateway having a packet data network (PDN) as an end point.

Based on the lowest three layers of the open system interconnection (OSI) reference model known in communication systems, the radio protocol stack between a UE and a network may be divided into Layer 1 (L1), Layer 2 (L2) and Layer 3 (L3). These layers are defined in pairs between a UE and an Evolved UTRAN (E-UTRAN), for data transmission via the Uu interface. The physical (PHY) layer at L1 provides an information transfer service on physical channels. The radio resource control (RRC) layer at L3 functions to control radio resources between the UE and the network. For this purpose, the RRC layer exchanges RRC messages between the UE and an eNB.

Figure 2:
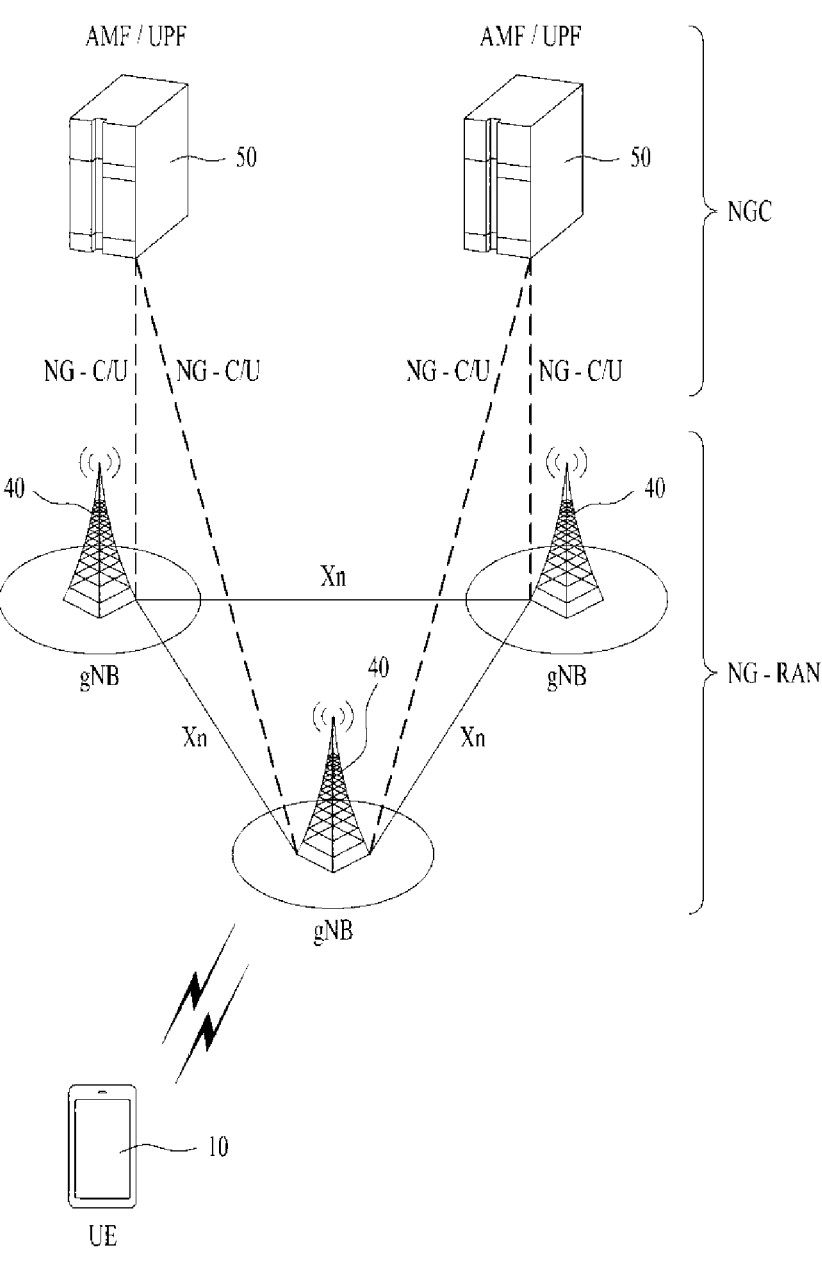
FIG. 2 illustrates the structure of an NR system to which embodiment(s) are applicable.

FIG. 2 illustrates the structure of a NR system to which the present disclosure is applicable.

Referring to FIG. 2, a next generation radio access network (NG-RAN) may include a next generation Node B (gNB) and/or an eNB, which provides user-plane and control-plane protocol termination to a UE. In FIG. 2, the NG-RAN is shown as including only gNBs, by way of example. A gNB and an eNB are connected to each other via an Xn interface. The gNB and the eNB are connected to a 5G core network (5GC) via an NG interface. More specifically, the gNB and the eNB are connected to an access and mobility management function (AMF) via an NG-C interface and to a user plane function (UPF) via an NG-U interface.

Figure 3:
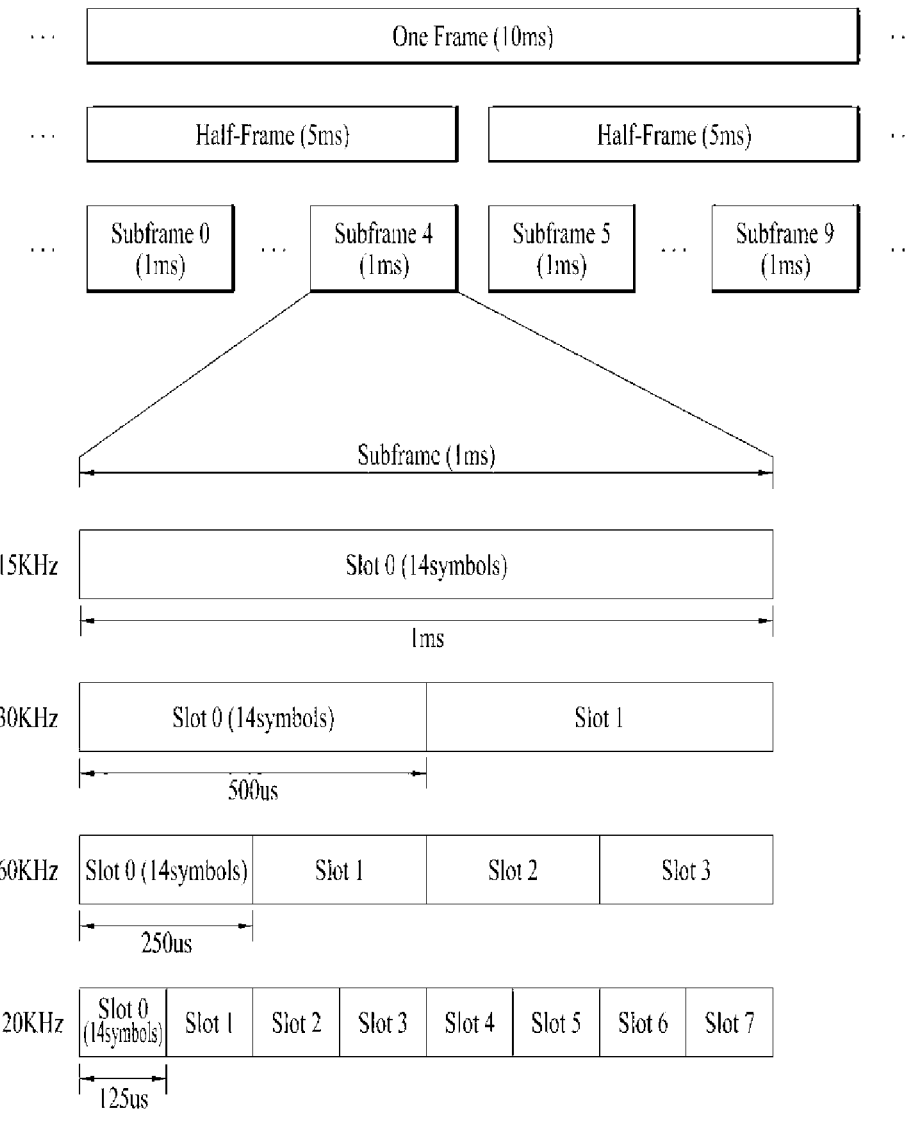
FIG. 3 illustrates the structure of an NR radio frame to which embodiment(s) are applicable.

FIG. 3 illustrates the structure of a NR radio frame to which the present disclosure is applicable.

Referring to FIG. 3, a radio frame may be used for UL transmission and DL transmission in NR. A radio frame is 10 ms in length and may be defined by two 5-ms half-frames. An HF may include five 1-ms subframes. A subframe may be divided into one or more slots, and the number of slots in an SF may be determined according to a subcarrier spacing (SCS). Each slot may include 12 or 14 OFDM(A) symbols according to a cyclic prefix (CP).

In a normal CP (NCP) case, each slot may include 14 symbols, whereas in an extended CP (ECP) case, each slot may include 12 symbols. Herein, a symbol may be an OFDM symbol (or CP-OFDM symbol) or an SC-FDMA symbol (or DFT-s-OFDM symbol).

Table 1 below lists the number of symbols per slot $N^{slot}_{symb}$, the number of slots per frame $N^{frame,\mu}_{slot}$, and the number of slots per subframe $N^{subframe,\mu}_{slot}$ according to an SCS configuration $\mu$ in the NCP case.

TABLE 1

| SCS (15*2u) | $N_{symb}^{slot}$ | $N_{slot}^{frame,\,u}$ | $N_{slot}^{subframe,\,u}$ |
|---|---|---|---|
| 15 kHz (u = 0) | 14 | 10 | 1 |
| 30 kHz (u = 1) | 14 | 20 | 2 |
| 60 kHz (u = 2) | 14 | 40 | 4 |
| 120 kHz (u = 3) | 14 | 80 | 8 |
| 240 kHz (u = 4) | 14 | 160 | 16 |

Table 2 below lists the number of symbols per slot, the number of slots per frame, and the number of slots per subframe according to an SCS in the ECP case.

TABLE 2

| SCS (15*2^u) | $N_{symb}^{slot}$ | $N_{slot}^{frame,\,u}$ | $N_{slot}^{subframe,\,u}$ |
|---|---|---|---|
| 60 kHz (u = 2) | 12 | 40 | 4 |

In the NR system, different OFDM(A) numerologies (e.g., SCSs, CP lengths, etc.) may be configured for a plurality of cells aggregated for one UE. Thus, the (absolute) duration of a time resource (e.g., SF, slot, or TTI) including the same number of symbols may differ between the aggregated cells (such a time resource is commonly referred to as a time unit (TU) for convenience of description).

In NR, multiple numerologies or SCSs to support various 5G services may be supported. For example, a wide area in conventional cellular bands may be supported when the SCS is 15 kHz, and a dense urban environment, lower latency, and a wider carrier bandwidth may be supported when the SCS is 30 kHz/60 kHz. When the SCS is 60 KHz or higher, a bandwidth wider than 24.25 GHz may be supported to overcome phase noise.

The NR frequency band may be defined as two types of frequency ranges. The two types of frequency ranges may be FR1 and FR2. The numerical values of the frequency ranges may be changed. For example, the two types of frequency ranges may be configured as shown in Table 3 below. Among the frequency ranges used in the NR system, FR1 may represent "sub 6 GHz range" and FR2 may represent "above 6 GHz range" and may be called millimeter wave (mmW).

TABLE 3

| Frequency Range designation | Corresponding frequency range | Subcarrier Spacing (SCS) |
|---|---|---|
| FR1 | 450 MHz-6000 MHz | 15, 30, 60 kHz |
| FR2 | 24250 MHz-52600 MHz | 60, 120, 240 kHz |

As mentioned above, the numerical values of the frequency ranges of the NR system may be changed. For example, FR1 may include a band of 410 MHz to 7125 MHz as shown in Table 4 below. That is, FR1 may include a frequency band of 6 GHz (or 5850 MHz, 5900 MHz, 5925 MHz, etc.) or higher. For example, the frequency band of 6 GHz (or 5850 MHz, 5900 MHz, 5925 MHz, etc.) or higher included in FR1 may include an unlicensed band. The unlicensed band may be used for various purposes, for example, for communication for vehicles (e.g., autonomous driving).

TABLE 4

| Frequency Range designation | Corresponding frequency range | Subcarrier Spacing (SCS) |
|---|---|---|
| FR1 | 410 MHz-7125 MHz | 15, 30, 60 kHz |
| FR2 | 24250 MHz-52600 MHz | 60, 120, 240 kHz |

Figure 4:
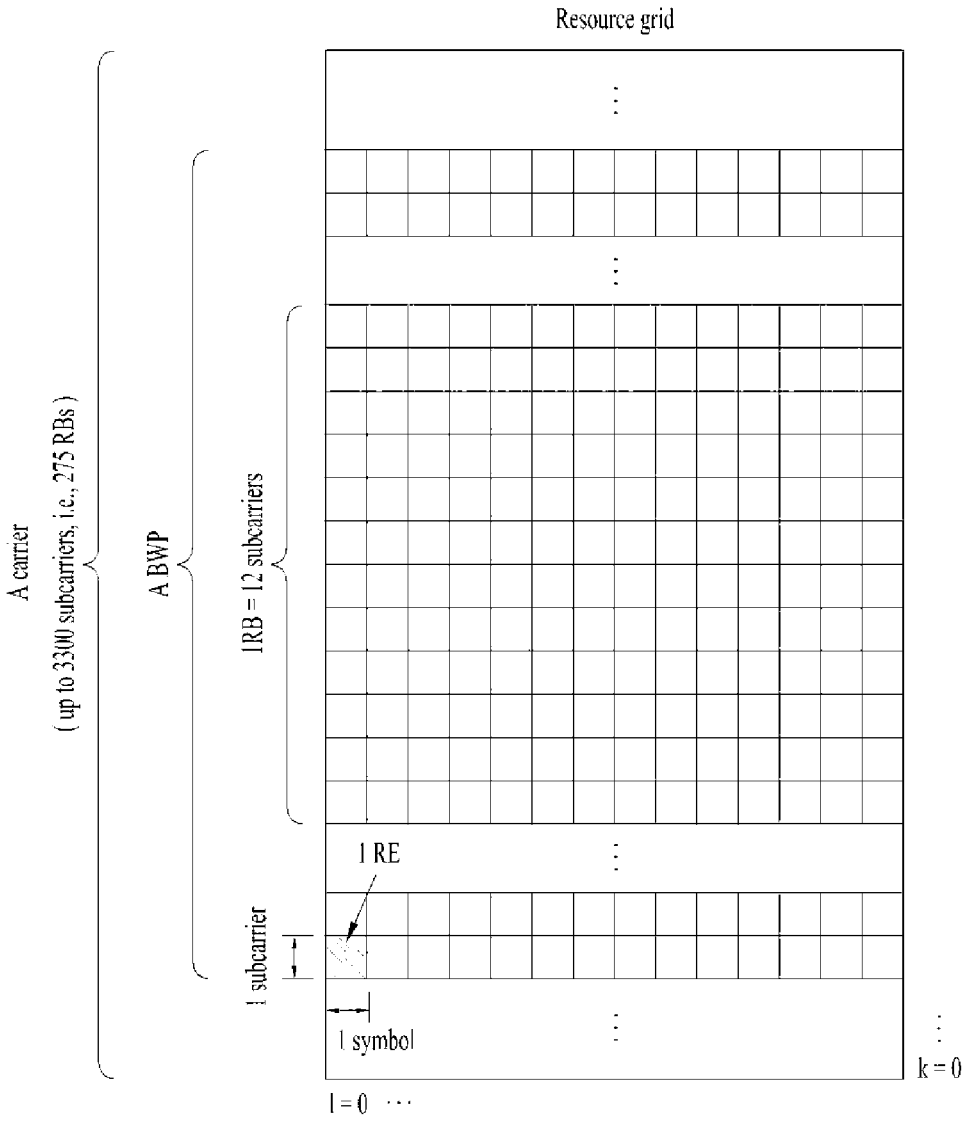
FIG. 4 illustrates the slot structure of an NR frame to which embodiment(s) are applicable.

FIG. 4 illustrates the slot structure of a NR frame to which the present disclosure is applicable.

Referring to FIG. 4, one slot includes a plurality of symbols in the time domain. For example, one slot may include 14 symbols in a normal CP and 12 symbols in an extended CP. Alternatively, one slot may include 7 symbols in the normal CP and 6 symbols in the extended CP.

A carrier may include a plurality of subcarriers in the frequency domain. A resource block (RB) is defined as a plurality of consecutive subcarriers (e.g., 12 subcarriers) in the frequency domain. A bandwidth part (BWP) may be defined as a plurality of consecutive (P)RBs in the frequency domain, and the BWP may correspond to one numerology (e.g., SCS, CP length, etc.). The carrier may include up to N (e.g., 5) BWPs. Data communication may be conducted in an activated BWP. In a resource grid, each element may be referred to as a resource element (RE) and may be mapped to one complex symbol.

The wireless interface between UEs or the wireless interface between a UE and a network may be composed of an L1 layer, an L2 layer, and an L3 layer. In various embodiments of the present disclosure, the L1 layer may represent a physical layer. The L2 layer may represent, for example, at least one of a MAC layer, an RLC layer, a PDCP layer, and an SDAP layer. The L3 layer may represent, for example, an RRC layer.

Bandwidth Part (BWP)

In the NR system, up to 400 MHz may be supported per component carrier (CC). If a UE operating on a wideband CC always operates with the RF for the entire CCs turned on, the battery consumption of the UE may be increased. Alternatively, considering various use cases (e.g., eMBB, URLLC, Mmtc, V2X, etc.) operating within one wideband CC, different numerologies (e.g., sub-carrier spacings) may be supported for different frequency bands within a specific CC. Alternatively, the capability for the maximum bandwidth may differ among the UEs. In consideration of this, the BS may instruct the UE to operate only in a partial bandwidth, not the entire bandwidth of the wideband CC. The partial bandwidth is defined as a bandwidth part (BWP) for simplicity. Here, the BWP may be composed of resource blocks (RBs) contiguous on the frequency axis, and may correspond to one numerology (e.g., sub-carrier spacing, CP length, slot/mini-slot duration).

The BS may configure multiple BWPs in one CC configured for the UE. For example, a BWP occupying a relatively small frequency region may be configured in a PDCCH monitoring slot, and a PDSCH indicated by the PDCCH in a larger BWP may be scheduled. Alternatively, when UEs are concentrated in a specific BWP, some of the UEs may be configured in another BWP for load balancing. Alternatively, a spectrum in the middle of the entire bandwidth may be punctured and two BWPs on both sides may be configured in the same slot in consideration of frequency-domain inter-cell interference cancellation between neighbor cells. That is, the BS may configure at least one DL/UL BWP for the UE associated with the wideband CC and activate at least one DL/UL BWP among the configured DL/UL BWP(s) at a specific time (through L1 signaling, MAC CE or RRC signalling, etc.). The BS may instruct the UE to switch to another configured DL/UL BWP (through L1 signaling, MAC CE or RRC signalling, etc.). Alternatively, when a timer expires, the UE may switch to a predetermined DL/UL BWP. The activated DL/UL BWP is defined as an active DL/UL BWP. The UE may fail to receive DL/UL BWP configuration during an initial access procedure or before an RRC connection is set up. A DL/UL BWP assumed by the UE in this situation is defined as an initial active DL/UL BWP.

Figure 5:
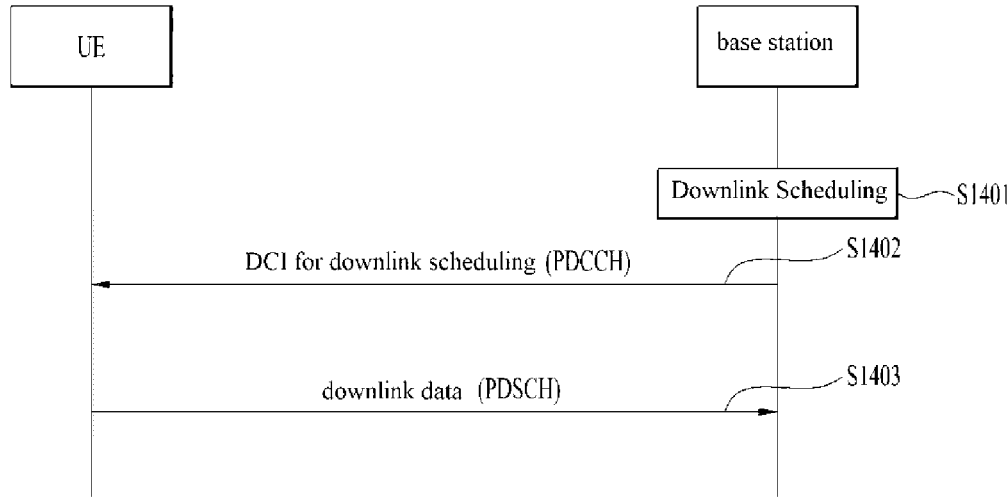
FIG. 5 illustrates a procedure in which a base station transmits a downlink signal to a UE.

FIG. 5 illustrates a procedure in which a BS transmits a downlink (DL) signal to a UE Referring to FIG. 5, the BS schedules DL transmission in relation to, for example, frequency/time resources, a transport layer, a DL precoder, and an MCS (S1401). In particular, the BS may determine a beam for PDSCH transmission to the UE through the above-described operations.

The UE receives downlink control information (DCI) for DL scheduling (i.e., including scheduling information about the PDSCH) from the BS on the PDCCH (S1402).

DCI format 1_0 or 1_1 may be used for DL scheduling. In particular, DCI format 1_1 includes the following information: an identifier for DCI formats, a bandwidth part indicator, frequency domain resource assignment, time domain resource assignment, a PRB bundling size indicator, a rate matching indicator, a ZP CSI-RS trigger, antenna port(s), transmission configuration indication (TCI), an SRS request, and a demodulation reference signal (DMRS) sequence initialization.

In particular, according to each state indicated in the antenna port(s) field, the number of DMRS ports may be scheduled, and single-user (SU)/multi-user (MU) transmission may also be scheduled.

In addition, the TCI field is configured in 3 bits, and the QCL for the DMRS is dynamically indicated by indicating a maximum of 8 TCI states according to the value of the TCI field.

The UE receives DL data from the BS on the PDSCH (S1403).

When the UE detects a PDCCH including DCI format 1_0 or 1_1, it decodes the PDSCH according to an indication by the DCI. Here, when the UE receives a PDSCH scheduled by DCI format 1, a DMRS configuration type may be configured for the UE by a higher layer parameter 'dmrs-Type', and the DMRS type is used to receive the PDSCH. In addition, the maximum number of front-loaded DMRS symbols for the PDSCH may be configured for the UE by the higher layer parameter 'maxLength'.

In the case of DMRS configuration type 1, when a single codeword is scheduled for the UE and an antenna port mapped to an index of {2, 9, 10, 11, or 30} is specified, or when two codewords are scheduled for the UE, the UE assumes that any of the remaining orthogonal antenna ports is not associated with PDSCH transmission to another UE.

Alternatively, in the case of DMRS configuration type 2, when a single codeword is scheduled for the UE and an antenna port mapped to an index of {2, 10, or 23} is specified, or when two codewords are scheduled for the UE, the UE assumes that any of the remaining orthogonal antenna ports is not associated with PDSCH transmission to another UE.

When the UE receives the PDSCH, it may assume that the precoding granularity P' is a consecutive resource block in the frequency domain. Here, P' may correspond to one of {2, 4, wideband}.

When P' is determined as wideband, the UE does not expect scheduling with non-contiguous PRBs, and may assume that the same precoding is applied to the allocated resources.

On the other hand, when P' is determined as any one of {2, 4}, a precoding resource block group (PRG) is divided into P' contiguous PRBs. The number of actually contiguous PRBs in each PRG may be greater than or equal to 1. The UE may assume that the same precoding is applied to contiguous DL PRBs in the PRG.

In order to determine a modulation order, a target code rate, and a transport block size in the PDSCH, the UE first reads the 5-bit MCD field in the DCI and determines the modulation order and the target code rate. Then, it reads the redundancy version field in the DCI, and determines the redundancy version. Then, the UE determines the transport block size based on the number of layers and the total number of allocated PRBs before rate matching.

Figure 6:
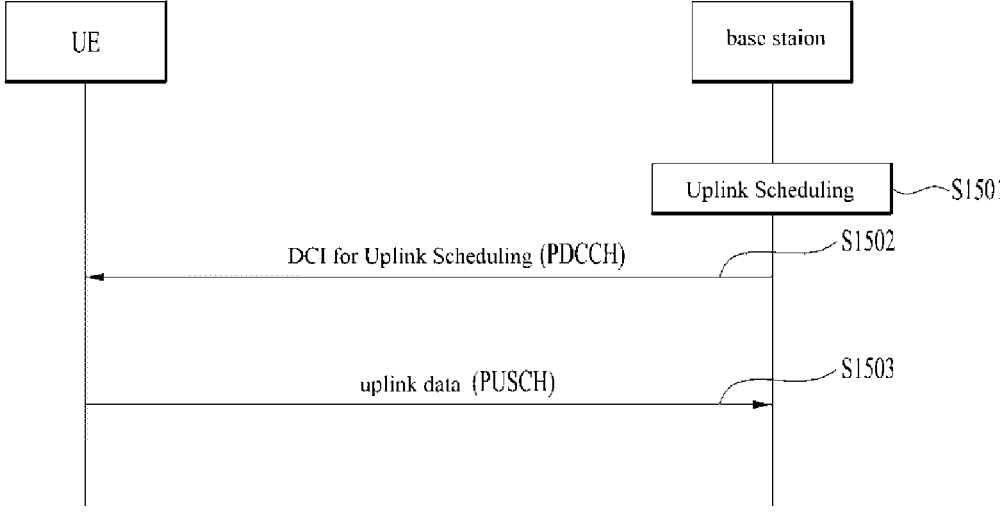
FIG. 6 illustrates a procedure in which a UE transmits an uplink signal to a base station.

FIG. 6 illustrates a procedure in which a UE transmits an uplink (UL) signal to a BS.

Referring to FIG. 6, the BS schedules UL transmission in relation to, for example, frequency/time resources, a transport layer, a UL precoder, and an MCS (S1501). In particular, the BS may determine, through the above-described operations, a beam for PUSCH transmission of the UE.

The UE receives DCI for UL scheduling (including scheduling information about the PUSCH) from the BS on the PDCCH (S1502).

DCI format 0_0 or 0_1 may be used for UL scheduling. In particular, DCI format 0_1 includes the following information: an identifier for DCI formats, a UL/supplementary UL (SUL), a bandwidth part indicator, frequency domain resource assignment, time domain resource assignment, a frequency hopping flag, a modulation and coding scheme (MCS), an SRS resource indicator (SRI), precoding information and number of layers, antenna port(s), an SRS request, DMRS sequence initialization, and UL shared channel (UL-SCH) indicator.

In particular, SRS resources configured in an SRS resource set associated with the higher layer parameter 'usage' may be indicated by the SRS resource indicator field. In addition, 'spatialRelationInfo' may be configured for each SRS resource, and the value thereof may be one of {CRI, SSB, SRI}.

The UE transmits UL data to the BS on PUSCH (S1503).

When the UE detects a PDCCH including DCI format 0_0 or 0_1, it transmits the PUSCH according to an indication by the DCI.

For PUSCH transmission, two transmission schemes are supported: codebook-based transmission and non-codebook-based transmission:

i) When the higher layer parameter 'txConfig' is set to 'codebook', the UE is configured for codebook-based transmission. On the other hand, when the higher layer parameter 'txConfig' is set to 'nonCodebook', the UE is configured for non-codebook based transmission. When the higher layer parameter 'txConfig' is not configured, the UE does not expect scheduling by DCI format 0_1. When the PUSCH is scheduled according to DCI format 0_0, PUSCH transmission is based on a single antenna port.

In the case of codebook-based transmission, the PUSCH may be scheduled by DCI format 0_0 or DCI format 0_1 or scheduled semi-statically. When the PUSCH is scheduled by DCI format 0_1, the UE determines the PUSCH transmission precoder based on the SRI, transmit precoding matrix indicator (TPMI) and transmission rank from the DCI, as given by the SRS resource indicator field and the precoding information and number of layers field. The TPMI is used to indicate a precoder to be applied across antenna ports and corresponds to an SRS resource selected by the SRI when multiple SRS resources are configured. Alternatively, when a single SRS resource is configured, the TPMI is used to indicate a precoder to be applied across antenna ports and corresponds to the single SRS resource. A transmission precoder is selected from the UL codebook having the same number of antenna ports as the higher layer parameter 'nrofSRS-Ports'. When the higher layer in which the UE is set to 'codebook' is configured with the parameter 'txConfig', at least one SRS resource is configured for the UE. The SRI indicated in slot n is associated with the most recent transmission of the SRS resource identified by the SRI, where the SRS resource precedes the PDCCH carrying the SRI (i.e., slot n).

ii) In the case of non-codebook-based transmission, the PUSCH may be scheduled by DCI format 0_0 or DCI format 0_1 or scheduled semi-statically. When multiple SRS resources are configured, the UE may determine the PUSCH precoder and transmission rank based on the wideband SRI. Here, the SRI is given by the SRS resource indicator in the DCI or by the higher layer parameter 'srs-ResourceIndicator'. The UE may use one or multiple SRS resources for SRS transmission. Here, the number of SRS resources may be configured for simultaneous transmission within the same RB based on UE capability. Only one SRS port is configured for each SRS resource. Only one SRS resource may be configured by the higher layer parameter 'usage' set to 'nonCodebook'. The maximum number of SRS resources that may be configured for non-codebook-based UL transmission is 4. The SRI indicated in slot n is associated with the most recent transmission of the SRS resource identified by the SRI, where the SRS transmission precedes the PDCCH carrying the SRI (i.e., slot n).

Figure 7:
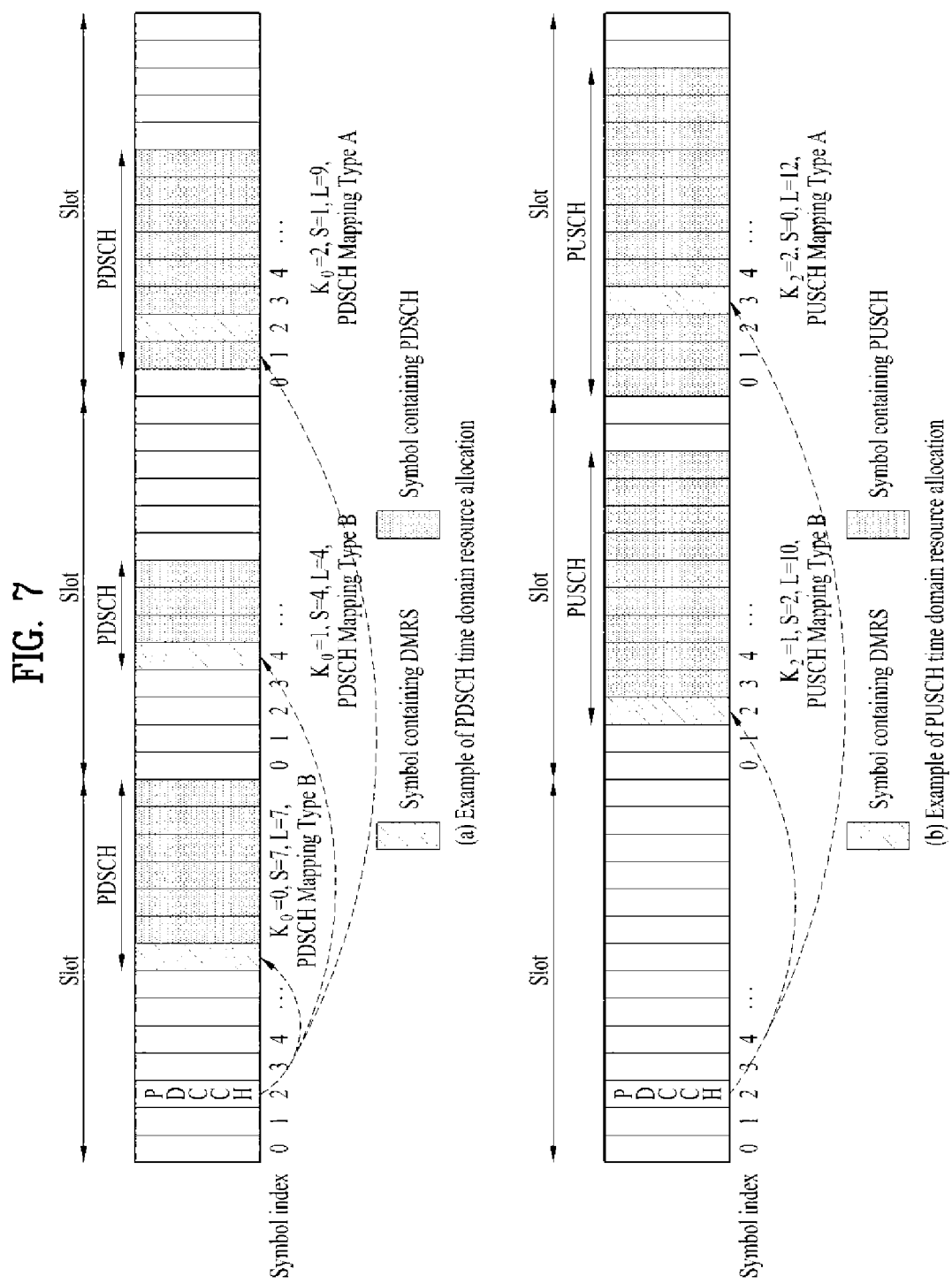
FIG. 7 illustrates an example of time domain resource allocation for a PDSCH by a PDCCH and an example of time domain resource allocation for a PUSCH by a PDCCH.

FIG. 7 illustrates an example of time domain resource allocation for a PDSCH by a PDCCH and an example of time domain resource allocation for a PUSCH by a PDCCH.

DCI carried by the PDCCH in order to schedule a PDSCH or a PUSCH includes a (time domain resource assignment, TDRA) field. The TDRA field provides a value m for a row index m+1 to an allocation table for the PDSCH or the PUSCH. Predefined default PDSCH time domain allocation is applied as the allocation table for the PDSCH, or a PDSCH TDRA table that the BS configures through RRC signaled pdsch-TimeDomainAllocationList is applied as the allocation table for the PDSCH. Predefined default PUSCH time domain allocation is applied as the allocation table for the PDSCH, or a PUSCH TDRA table that the BS configures through RRC signaled pusch-TimeDomainAllocationList is applied as the allocation table for the PUSCH. The PDSCH TDRA table to be applied and/or the PUSCH TDRA table to be applied may be determined according a fixed/predefined rule (e.g., refer to 3GPP TS 38.214)

In PDSCH time domain resource configurations, each indexed row defines a DL assignment-to-PDSCH slot offset $K_0$, a start and length indicator value SLIV (or directly, a start position (e.g., start symbol index S) and an allocation length (e.g., the number of symbols, L) of the PDSCH in a slot), and a PDSCH mapping type. In PUSCH time domain resource configurations, each indexed row defines a UL grant-to-PUSCH slot offset $K_2$, a start position (e.g., start symbol index S) and an allocation length (e.g., the number of symbols, L) of the PUSCH in a slot, and a PUSCH mapping type. $K_0$ for the PDSCH and $K_2$ for the PUSCH indicate the difference between the slot with the PDCCH and the slot with the PDSCH or PUSCH corresponding to the PDCCH. SLIV denotes a joint indicator of the start symbol S relative to the start of the slot with the PDSCH or PUSCH and the number of consecutive symbols, L, counting from the symbol S. The PDSCH/PUSCH mapping type includes two mapping types: one is mapping Type A and the other is mapping Type B. In PDSCH/PUSCH mapping Type A, a demodulation reference signal (DMRS) is located in the third symbol (symbol #2) or fourth symbol (symbol #3) in a slot according to RRC signaling. In PDSCH/PUSCH mapping Type B, the DMRS is located in the first symbol allocated for the PDSCH/PUSCH.

The scheduling DCI includes an FDRA field that provides assignment information about RBs used for the PDSCH or the PUSCH. For example, the FDRA field provides information about a cell for PDSCH or PUSCH transmission, information about a BWP for PDSCH or PUSCH transmission, and/or information about RBs for PDSCH or PUSCH transmission to the UE.

Resource Allocation by RRC

As mentioned above, there are two types of transmission without a dynamic grant: configured grant Type 1 and configured grant Type 2. In configured grant Type 1, a UL grant is provided by RRC signaling and stored as a configured UL grant. In configured grant Type 2, the UL grant is provided by the PDCCH and stored or cleared as the configured UL grant based on L1 signaling indicating configured UL grant activation or deactivation. Type 1 and Type 2 may be configured by RRC signaling per serving cell and per BWP. Multiple configurations may be simultaneously activated on different serving cells.

When configured grant Type 1 is configured, the UE may be provided with the following parameters through RRC signaling:

cs-RNTI corresponding to a CS-RNTI for retransmission;

periodicity corresponding to a periodicity of configured grant Type 1:

timeDomainOffset indicating an offset of a resource with respect to system frame number (SFN)=0 in the time domain:

timeDomainAllocation value m that provides a row index m+1 pointing to the allocation table, indicating a combination of the start symbol S, the length L, and the PUSCH mapping type:

frequencyDomainAllocation that provides frequency domain resource allocation; and mcsAndTBS that provides $I_{MCS}$ indicating a modulation order, a target code rate, and a transport block size.

Upon configuration of configured grant Type 1 for a serving cell by RRC, the UE stores the UL grant provided by RRC as a configured UL grant for an indicated serving cell and initializes or re-initializes the configured UL grant to start in a symbol according to timeDomainOffset and S (derived from SLIV) and to recur with periodicity. After the UL grant is configured for configured grant Type 1, the UE may consider that the UL grant recurs in association with each symbol satisfying: [(SFN*numberOfSlotsPerFrame (numberOfSymbolsPerSlot)+(slot number in the frame*numberOfSymbolsPerSlot)+symbol number in the slot]=(timeDomainOffset*numberOfSymbolsPerSlot+S+ N*periodicity) modulo (1024*numberOfSlotsPerFrame*numberOfSymbolsPerSlot), for all N>=0, where numberOfSlotsPerFrame and numberOfSymbolsPerSlot indicate the number of consecutive slots per frame and consecutive OFDM symbols per slot.

For configured grant Type 2, the UE may be provided with the following parameters by the BS through RRC signaling:

cs-RNTI corresponding to a CS-RNTI for activation, deactivation, and retransmission; and periodicity that provides a periodicity of configured grant Type 2.

An actual UL grant is provided to the UE by the PDCCH (addressed to the CS-RNTI). After the UL grant is configured for configured grant Type 2, the UE may consider that the UL grant recurs in association with each symbol satisfying:

[(SFN*numberOfSlotsPerFrame*numberOfSymbolsPerSlot)+ (slot number in the frame*numberOfSymbolsPerSlot)+symbol number in the slot]= [(SFN$_{start}$ $_{time}$ *numberOfSlotsPerFrame*numberOfSymbolsPerSlot+ slot$_{start}$ $_{time}$ *numberOfSymbolsPerSlot+symbol$_{start}$ $_{time}$ )+ N*periodicity] modulo (1024*numberOfSlotsPerFrame*numberOfSymbolsPerSlot), for all N>=0, where SFN$_{start}$ $_{time}$ , slot$_{start}$ $_{time}$ , and symbol$_{start}$ $_{time}$ represent an SFN, a slot, and a symbol, respectively, of the first transmission opportunity of the PUSCH after the configured grant is (re-)initialized, and numberOfSlotsPerFrame and numberOfSymbolsPerSlot indicate the number of consecutive slots per frame and consecutive OFDM symbols per slot, respectively.

On DL, the UE may be configured with semi-persistent scheduling (SPS) per serving cell and per BWP by RRC signaling from the BS. For DL SPS, DL assignment is provided to the UE by the PDCCH and stored or cleared based on L1 signaling indicating SPS activation or deactivation. When SPS is configured, the UE may be provided with the following parameters by the BS through RRC signaling:

cs-RNTI corresponding to a CS-RNTI for activation, deactivation, and retransmission:

nrofHARQ-Processes that provides the number of (hybrid automatic repeat request) HARQ processes for SPS; and periodicity that provides a periodicity of configured DL assignment for SPS.

After DL assignment is configured for SPS, the UE may consider sequentially that N-th DL assignment occurs in a slot satisfying: (numberOfSlotsPerFrame*SFN+slot number in the frame)=[(numberOfSlotsPerFrame*SFN$_{start}$ $_{time}$ + slot$_{start}$ $_{time}$ )+N*periodicity*numberOfSlotsPerFrame/10] modulo (1024*numberOfSlotsPerFrame), where SFN$_{start}$ $_{time}$ and slot$_{start}$ $_{time}$ represent an SFN and a slot, respectively, of first transmission of the PDSCH after configured DL assignment is (re-)initialized, and numberOfSlotsPerFrame and numberOfSymbolsPerSlot indicate the number of consecutive slots per frame and consecutive OFDM symbols per slot, respectively.

If the CRC of a corresponding DCI format is scrambled with the CS-RNTI provided by the RRC parameter cs-RNTI, and a new data indicator field for an enabled transport block is set to 0, the UE validates, for scheduling activation or scheduling release, a DL SPS assignment PDCCH or a configured UL grant Type 2 PDCCH. Validation of the DCI format is achieved if all fields for the DCI format are set. An example of special fields for DL SPS and UL grant Type 2 scheduling activation PDCCH validation, and an example of special fields for DL SPS and UL grant Type 2 scheduling release PDCCH validation Equation 1 below may be used to calculate T$_{proc,1}$, which is related to the following UE PDSCH processing procedure time. The parameters of Equation 1 may be defined as shown in Table 5 and Table 6 (see 3GPP TS 38.133, 3GPP TS 38.211, and 3GPP TS 38.214).

$$T_{proc,1} = (N_1 + d_{1,1} + d_2)(2048 + 144) \cdot \kappa 2^{-\mu} \cdot T_C + T_{ext} \qquad \text{[Equation 1]}$$

TABLE 5

UE PDSCH processing procedure time

If the first uplink symbol of the PUCCH which carries the HARQ-ACK information, as defined by the assigned HARQ-ACK timing K$_1$ and the PUCCH resource to be used and including the effect of the timing advance, starts no earlier than at symbol L$_1$, where L$_1$ is defined as the next uplink symbol with its CP starting after $T_{proc,1} = (N_1 + d_{1,1} + d_2)(2048+144) \cdot \kappa 2^{-\mu} \cdot T_c + T_{m1}$ after the end of the last symbol of the PDSCH carrying the TB being acknowledged, then the UE shall provide a valid HARQ-ACK message.

- N$_1$ is based on $\mu$ of table 5.3-1 and table 5.3-2 for UE processing capability 1 and 2 respectively, where $\mu$ corresponds to the one of ($\mu_{PDCCH}$, $\mu_{PDSCH}$, $\mu_{UL}$) resulting with the largest T$_{proc,1}$, where the $\mu_{PDCCH}$ corresponds to the subcarrier spacing of the PDCCH scheduling the PDSCH, the $\mu_{PDSCH}$ corresponds to the subcarrier spacing of the scheduled PDSCH, and $\mu_{UL}$ corresponds to the subcarrier spacing of the uplink channel with which the HARQ-ACK is to be transmitted, and $\kappa$ is defined in clause 4.1 of [4, TS 38.211].

- For operation with shared spectrum channel access, T$_{ext}$ is calculated according to [4, TS 38.211], otherwise T$_{ext}$ =0.

- If the PDSCH DM-RS position l$_1$ for the additional DM-RS in Table 7.4.1.1.2-3 in clause 7.4.1.1.2 of [4, TS 38.211] is l$_1$ = 12 then N$_{1,0}$=14 in Table 5.3-1, otherwise N$_{1,0}$=13.

- If the UE is configured with multiple active component carriers, the first uplink symbol which carries the HARQ-ACK information further includes the effect of timing difference between the component carriers as given in [11, TS 38.133].

- For the PDSCH mapping type A as given in clause 7.4.1.1 of [4, TS 38.211]: if the last symbol of PDSCH is on the i-th symbol of the slot where 1 < 7, then d$_{1,1}$= 7 − i, otherwise d$_{1,1}$ = 0

- If a PUCCH of a larger priority index would overlap with PUCCH/PUSCH of a smaller priority index, d$_2$ for the PUCCH of a larger priority is set as reported by the UE; otherwise d$_2$= 0.

- For UE processing capability 1: If the PDSCH is mapping type B as given in clause 7.4.1.1 of [4, TS 38.211], and

TABLE 6

- if the number of PDSCH symbols allocated is L ≥ 7, then $d_{1,1} = 0$,
- if the number of PDSCH symbols allocated is L ≥ 4 and L ≤ 6, then $d_{1,1} = 7 - L$.
- if the number of PDSCH symbols allocated is L = 3 then $d_{1,1} = 3 + \min(d,1)$, where d is the number of overlapping symbols of the scheduling PDCCH and the scheduled PDSCH.
- if the number of PDSCH symbols allocated is 2, then $d_{1,1} = 3+d$, where d is the number of overlapping symbols of the scheduling PDCCH and the scheduled PDSCH.
- For UE processing capability 2: If the PDSCH is mapping type B as given in clause 7.4.1.1 of [4, TS 38.211],
  - if the number of PDSCH symbols allocated is L ≥ 7, then $d_{1,1} = 0$,
  - if the number of PDSCH symbols allocated is L ≥ 3 and L ≤ 6, then $d_{1,1}$ is the number of overlapping symbols of the scheduling PDCCH and the scheduled PDSCH,
  - if the number of PDSCH symbols allocated is 2,
    - if the scheduling PDCCH was in a 3-symbol CORESET and the CORESET and the PDSCH had the same starting symbol, then $d_{1,1} = 3$,
    - otherwise $d_{1,1}$ is the number of overlapping symbols of the scheduling PDCCH and the scheduled PDSCH.
- For UE processing capability 2 with scheduling limitation when $\mu_{PDSCH} = 1$, if the scheduled RB allocation exceeds 136 RBs, the UE defaults to capability 1 processing time. The UE may skip decoding a number of PDSCHs with last symbol within 10 symbols before the start of a PDSCH that is scheduled to follow Capability 2, if any of those PDSCHs are scheduled with more than 136 RBs with 30kHz SCS and following Capability 1 processing time.
- For a UE that supports capability 2 on a given cell, the processing time according to UE processing capability 2 is applied if the high layer parameter processingType2Enabled in PDSCH-ServingCellConfig is configured for the cell and set to 'enable'.
- If this PUCCII resource is overlapping with another PUCCH or PUSCH resource, then HARQ-ACK is multiplexed following the procedure in clause 9.2.5 of [6, TS 38.213], otherwise the HARQ-ACK message is transmitted on PUCCH.

Figure 8:
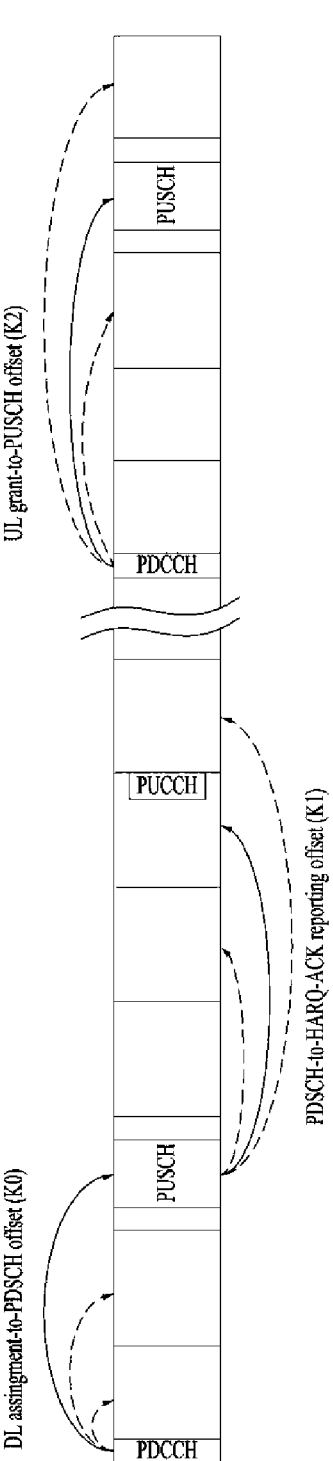
FIG. 8 is a diagram illustrating a HARQ-ACK operation in relation to operation of a UE for reporting control information.

FIG. 8 is a diagram illustrating a HARQ-ACK operation in relation to operation of a UE for reporting control information.

First, HARQ in NR may have the following characteristics (hereinafter, H-1 and H-2).

H-1) 1-bit HARQ-ACK feedback per transport block (TB) may be supported. Here, the operation of one DL HARQ process is supported for some UEs, whereas the operation of one or more DL HARQ processes is supported for a given UE.

H-2) The UE may support a set of minimum HARQ processing times. Here, the minimum HARQ processing time means a minimum required time until a corresponding HARQ-ACK transmission timing from a timing when the UE receives DL data from the BS. In this regard, two UE processing times N1 and K1 may be defined according to (1) symbol granularity and (2) slot granularity. Here, K1 may represent the number of slots from a PDSCH slot to a corresponding HARQ-ACK transmission slot.

First, from the viewpoint of the UE, N1 represents the number of OFDM symbols required for UE processing from the end of PDSCH reception to the earliest possible start of corresponding HARQ-ACK transmission. N1 may be defined as shown in Tables 7 and 8 below according to OFDM numerology (i.e., subcarrier spacing) and a DMRS pattern.

TABLE 7

| Configuration | HARQ Timing Parameter | Units | 15 kHz SCS | 30 kHz SCS | 60 kHz SCS | 120 kHz SCS |
|---|---|---|---|---|---|---|
| Front-loaded DMRS only | N1 | Symbols | 8 | 10 | 17 | 20 |
| Front-loaded DMRS only + additional DMRS | N1 | Symbols | 13 | 13 | 20 | 24 |

TABLE 8

| Configuration | HARQ Timing Parameter | Units | 15 kHz SCS | 30 kHz SCS | 60 kHz SCS |
|---|---|---|---|---|---|
| Front-loaded DMRS only | N1 | Symbols | 3 | 4.5 | 9(FR1) |
| Front-loaded DMRS only + additional DMRS | N1 | Symbols | [13] | [13] | [20] |

Referring to FIG. 8, a HARQ-ACK timing K1 may indicate the number of slots from a PDSCH slot to a corresponding HARQ-ACK transmission slot. K0 represents the number of slots from a slot with a DL grant PDCCH to a slot with corresponding PDSCH transmission, and K2 represents the number of slots from a slot with a UL grant PDCCH to a slot with corresponding PUSCH transmission. That is, KO, K1, and K2 may be briefly summarized as shown in Table 9 below.

TABLE 9

| | A | B |
|---|---|---|
| K0 | DL scheduling DCI | Corresponding DL data transmission |
| K1 | DL data reception | Corresponding HARQ-ACK |
| K2 | UL scheduling DCI | Corresponding UL data transmission |

A slot timing between A and B is indicated by a field in DCI from a set of values. In addition, NR supports different minimum HARQ processing times between UEs. The HARQ processing time includes a delay between a DL data reception timing and a corresponding HARQ-ACK transmission timing and a delay between a UL grant reception timing and a corresponding UL data transmission timing. The UE transmits the capability of a minimum HARQ processing time thereof to the BS. Asynchronous and adaptive DL HARQ is supported at least in enhanced mobile broadband (eMBB) and ultra-reliable low latency (URLLC).

From the viewpoint of the UE, HARQ ACK/NACK feedback for multiple DL transmissions in the time domain may be transmitted in one UL data/control domain. A timing between DL data reception and corresponding acknowledgment is indicated by a field in DCI from a set of values, and the set of values is configured by a higher layer. The timing is defined at least for the case in which the timing is not known to the UE.

Figure 9:
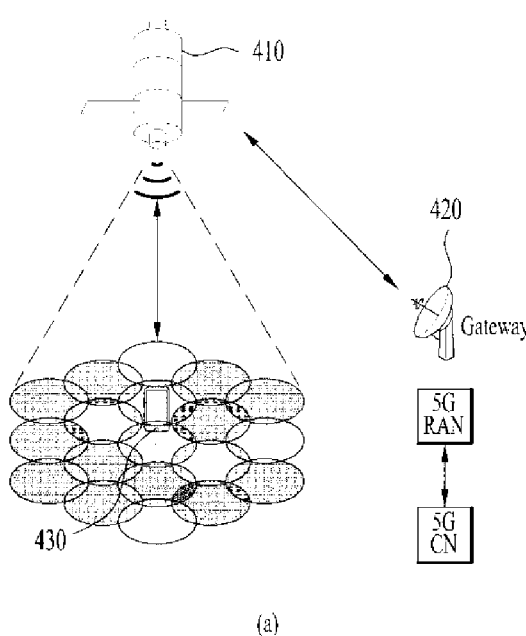
FIG. 9 illustrates a non-terrestrial network (NTN).
Figure 9:
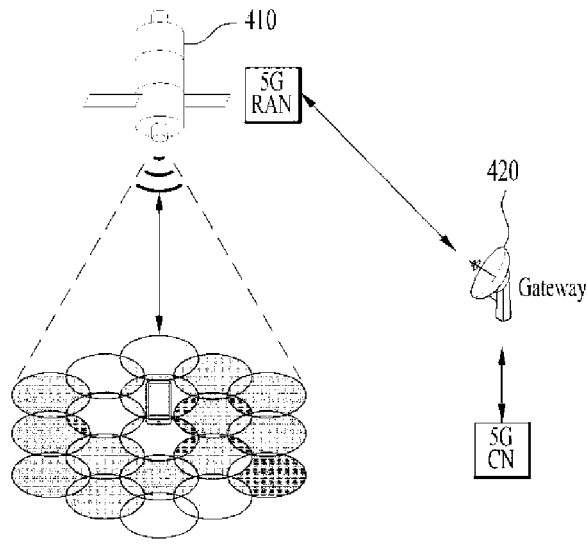

FIG. 9 illustrates a non-terrestrial network (NTN).

A non-terrestrial network (NTN) refers to a wireless network configured using satellites (e.g., geostationary earth orbit satellites (GEO)/low-earth orbit satellites (LEO)). Based on the NTN, coverage may be extended, and a highly reliable network service may be provided. For example, the NTN may be configured alone, or may be combined with a conventional terrestrial network to configure a wireless communication system. For example, in the NTN network, i) a link between a satellite and a UE, ii) a link between satellites, iii) a link between a satellite and a gateway, and the like may be configured.

The following terms may be used to describe the configuration of a wireless communication system employing satellites.

Satellite: a space-borne vehicle embarking a bent pipe payload or a regenerative payload telecommunication transmitter, placed into Low-Earth Orbit (LEO) typically at an altitude between 500 km to 2000 km, Medium-Earth Orbit (MEO) typically at an altitude between 8000 to 20000 lm, or Geostationary satellite Earth Orbit (GEO) at 35 786 km altitude.

Satellite network: Network, or segments of network, using a space-borne vehicle to embark a transmission equipment relay node or BS.

Satellite RAT: a RAT defined to support at least one satellite.

5G Satellite RAT: a Satellite RAT defined as part of the New Radio.

5G satellite access network: 5G access network using at least one satellite.

Terrestrial: located at the surface of Earth.

Terrestrial network: Network, or segments of a network located at the surface of the Earth.

Use cases that may be provided by a communication system employing a satellite connection may be divided into three categories. The "Service Continuity" category may be used to provide network connectivity in geographic areas where 5G services cannot be accessed through the wireless coverage of terrestrial networks. For example, a satellite connection may be used for a UE associated with a pedestrian user or a UE on a moving land-based platform (e.g., car, coach, truck, train), air platform (e.g., commercial or private jet) or marine platform (e.g., marine vessel). In the "Service Ubiquity" category, when terrestrial networks are unavailable (due to, for example, disaster, destruction, economic situations, etc.), satellite connections may be used for IoT/public safety-related emergency networks/home access, etc. The "Service Scalability" category includes services using wide coverage of satellite networks.

For example, a 5G satellite access network may be connected to a 5G core Network. In this case, the satellite may be a bent pipe satellite or a regenerative satellite. The NR radio protocols may be used between the UE and the satellite. Also, F1 interface may be used between the satellite and the gNB.

As described above, a non-terrestrial network (NTN) refers to a wireless network configured using a device that is not fixed on the ground, such as satellite. A representative example is a satellite network. Based on the NTN, coverage may be extended, and a highly reliable network service may be provided. For example, the NTN may be configured alone, or may be combined with an existing terrestrial network to configure a wireless communication system.

Use cases that may be provided by a communication system employing an NTN may be divided into three categories. The "Service Continuity" category may be used to provide network connectivity in geographic areas where 5G services cannot be accessed through the wireless coverage of terrestrial networks. For example, a satellite connection may be used for a UE associated with a pedestrian user or a UE on a moving land-based platform (e.g., car, coach, truck, train), air platform (e.g., commercial or private jet) or marine platform (e.g., marine vessel). In the "Service Ubiquity" category, when terrestrial networks are unavailable (due to, for example, disaster, destruction, economic situations, etc.), satellite connections may be used for IoT/public safety-related emergency networks/home access, etc. The "Service Scalability" category includes services using wide coverage of satellite networks.

Referring to FIG. 9, the NTN includes one or more satellites 410, one or more NTN gateways 420 capable of communicating with the satellites, and one or more UEs (/BSs) 430 capable of receiving mobile satellite services from the satellites. For simplicity, the description is focused on the example of the NTN including satellites but is not intended to limit the scope of the present disclosure. Accordingly, the NTN may include not only the satellites, but also aerial vehicles (Unmanned Aircraft Systems (UAS) encompassing tethered UAS (TUA), Lighter than Air UAS (LTA), Heavier than Air UAS (HTA), all operating in altitudes typically between 8 and 50 km including High Altitude Platforms (HAPs)).

The satellite 410 is a space-borne vehicle equipped with a bent pipe payload or a regenerative payload telecommunication transmitter and may be located in a low earth orbit (LEO), a medium earth orbit (MEO), or a geostationary earth orbit (GEO). The NTN gateway 420 is an earth station or gateway existing on the surface of the earth and provides sufficient RF power/sensitivity to access the satellite. The NTN gateway corresponds to a transport network layer (TNL) node.

The NTN may have i) a link between a satellite and a UE, ii) a link between satellites, iii) a link between a satellite and an NTN gateway. A service link refers to a radio link between a satellite and a UE. Inter-satellite links (ISLs) between satellites may be present when there are multiple satellites. A feeder link refers to a radio link between an NTN gateway and a satellite (or UAS platform). The gateway may be connected to a data network and may communicate with a satellite through the feeder link. The UE may communicate via the satellite and service link.

As NTN operation scenarios, two scenarios which are based on transparent payload and regenerative payload, respectively may be considered. FIG. 9-(*a*) shows an example of a scenario based on a transparent payload. In the scenario based on the transparent payload, the signal repeated by the payload is not changed. The satellites 410 repeat the NR-Uu radio interface from the feeder link to the service link (or vice versa), and the satellite radio interface (SRI) on the feeder link is NR-Uu. The NTN gateway 420 supports all functions necessary to transfer the signal of the NR-Uu interface. Also, different transparent satellites may be connected to the same gNB on the ground. FIG. 9-(*b*) shows an example of a scenario based on a regenerative payload. In the scenario based on the regenerative payload, the satellite 410 may perform some or all of the functions of a conventional BS (e.g., gNB), and may thus perform some or all of frequency conversion/demodulation/decoding/ modulation. The service link between the UE and a satellite is established using the NR-Uu radio interface, and the feeder link between the NTN gateway and a satellite is established using the satellite radio interface (SRI). The SRI corresponds to a transport link between the NTN gateway and the satellite.

The UE 430 may be connected to 5GCN through an NTN-based NG-RAN and a conventional cellular NG-RAN simultaneously. Alternatively, the UE may be connected to the 5GCN via two or more NTNs (e.g., LEO NTN and GEO NTN, etc.) simultaneously.

Figure 10:
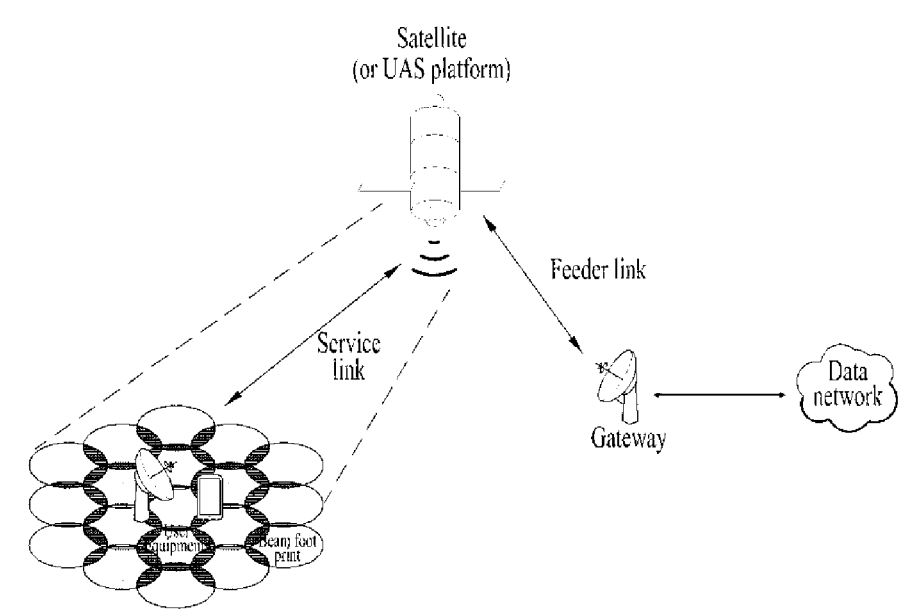
FIG. 10 illustrates an overview and a scenario of an NTN.
Figure 10:
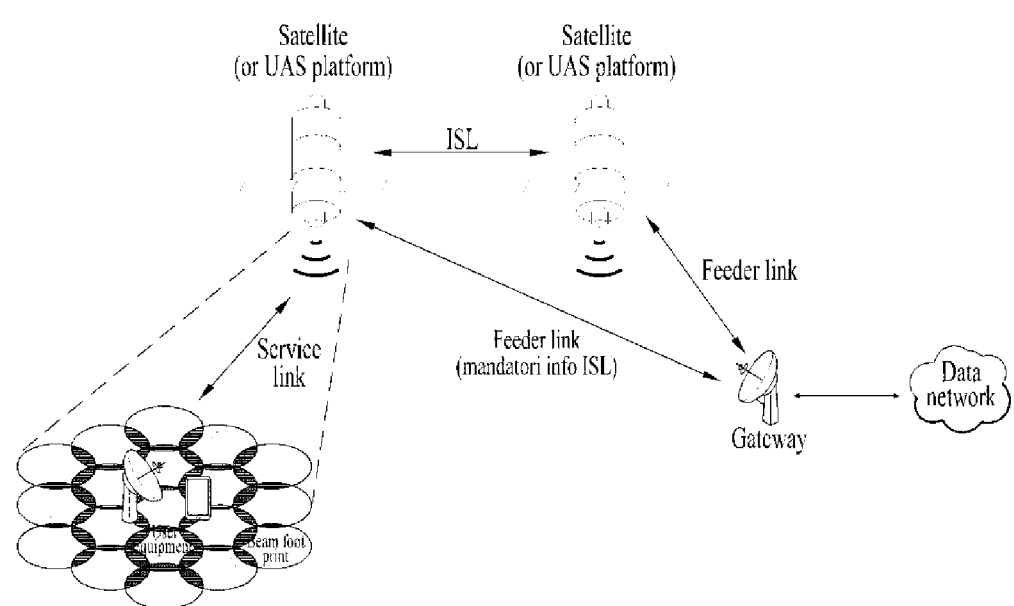

FIG. 10 illustrates an overview and a scenario of an NTN.

NTN refers to a network or network segment in which a satellite (or UAS platform) uses RF resources. Typical scenarios of the NTN providing access to a UE include an NTN scenario based on a transparent payload as shown in FIG. 10-(a) and an NTN scenario based on a regenerative payload as shown in FIG. 10-(b).

NTN typically features the following elements,

One or several sat-gateways that connect the Non-Terrestrial Network to a public data network A GEO satellite is fed by one or several sat-gateways which are deployed across the satellite targeted coverage (e.g., regional or even continental coverage). We assume that UE in a cell is served by only one sat-gateway.

A Non-GEO satellite served successively by one or several sat-gateways at a time. The system ensures service and feeder link continuity between the successive serving sat-gateways with sufficient time duration to proceed with mobility anchoring and hand-over.

A feeder link or radio link between a sat-gateway and the satellite (or UAS platform)

A service link or radio link between the user equipment and the satellite (or UAS platform).

A satellite (or UAS platform) which may implement either a transparent or a regenerative (with on board processing) payload. The satellite (or UAS platform) generates beams typically generate several beams over a given service area bounded by its field of view. The footprints of the beams are typically of elliptic shape. The field of view of a satellite (or UAS platforms) depends on the on board antenna diagram and min elevation angle.

A transparent payload: Radio Frequency filtering, Frequency conversion and amplification. Hence, the waveform signal repeated by the payload is un-changed;

A regenerative payload: Radio Frequency filtering, Frequency conversion and amplification as well as demodulation/decoding, switch and/or routing, coding/ modulation. This is effectively equivalent to having all or part of BS (e.g., gNB) functions on board the satellite (or UAS platform).

Inter-satellite links (ISL) optionally in case of a constellation of satellites. This will require regenerative payloads on board the satellites. ISL may operate in RF frequency or optical bands.

User Equipment is served by the satellite (or UAS platform) within the targeted service area.

Table 10 below defines various types of satellites (or UAS platforms).

TABLE 10

| Platforms | Altitude range | Orbit | Typical beam footprint size |
|---|---|---|---|
| Low-Earth Orbit (LEO) satellite | 300-1500 km | Circular around the earth | 100-1000 km |
| Medium-Earth Orbit (MEO) satellite | 7000-25000 km | | 100-1000 km |
| Geostationary Earth Orbit (GEO) satellite | 35 786 km | notional station keeping position fixed in terms of | 200-3500 km |
| UAS platform (including HAPS) | 8-50 km (20 km for HAPS) | elevation/azimuth with respect to a given earth point | 5-200 km |
| High Elliptical Orbit (HEO) satellite | 400-50000 km | Elliptical around the earth | 200-3500 km |

Typically, GEO satellite and UAS are used to provide continental, regional or local service. A constellation of LEO and MEO is used to provide services in both Northern and Southern hemispheres. In some case, the constellation can even provide global coverage including polar regions. For the later, this requires appropriate orbit inclination, sufficient beams generated and inter-satellite links. HEO satellite systems are not considered in this document.

An NTN that provides access to a terminal in six reference scenarios described below can be considered.

Circular orbiting and notional station keeping platforms.

Highest RTD constraint

Highest Doppler constraint

A transparent and a regenerative payload

One ISL case and one without ISL. Regenerative payload is mandatory in the case of inter-satellite links.

Fixed or steerable beams resulting respectively in moving or fixed beam footprint on the ground Six scenarios are considered as depicted in Table 11 and are detailed in Table 12.

TABLE 11

| | Transparent satellite | Regenerative satellite |
|---|---|---|
| GEO based non-terrestrial access network | Scenario A | Scenario B |
| LEO based non-terrestrial access network: steerable beams | Scenario C1 | Scenario D1 |
| LEO based non-terrestrial access network: the beams move with the satellite | Scenario C2 | Scenario D2 |

TABLE 12

| Scenarios | GEO based non-terrestrial access network (Scenario A and B) | LEO based non-terrestrial access network (Scenario C & D) |
|---|---|---|
| Orbit type | notional station keeping position fixed in terms of elevation/azimuth with respect to a given earth point | circular orbiting around the earth |

TABLE 12-continued

| Scenarios | GEO based non-terrestrial access network (Scenario A and B) | LEO based non-terrestrial access network (Scenario C & D) |
|---|---|---|
| Altitude | 35,786 km | 600 km<br>1,200 km |
| Spectrum (service link) | <6 GHz (e.g., 2 GHz)<br>>6 GHz (e.g., DL 20 GHz, UL 30 GHz) | |
| Max channel bandwidth capability (service link) | 30 MHz for band < 6 GHz<br>1 GHz for band > 6 GHz | |
| Payload | Scenario A: Transparent (including radio frequency function only)<br>Scenario B: regenerative (including all or part of RAN functions) | Scenario C: Transparent (including radio frequency function only)<br>Scenario D: Regenerative (including all or part of RAN functions) |
| Inter-Satellite link | No | Scenario C: No<br>Scenario D: Yes/No (Both cases are possible.) |
| Earth-fixed beams | Yes | Scenario C1: Yes (steerable beams), see note 1<br>Scenario C2: No (the beams move with the satellite)<br>Scenario D 1: Yes (steerable beams), see note 1<br>Scenario D 2: No (the beams move with the satellite) |
| Max beam footprint size (edge to edge) regardless of the elevation angle | 3500 km (Note 5) | 1000 km |
| Min Elevation angle for both sat-gateway and user equipment | 10° for service link and 10° for feeder link | 10° for service link and 10° for feeder link |
| Max distance between satellite and user equipment at min elevation angle | 40,581 km | 1,932 km (600 km altitude)<br>3,131 km (1,200 km altitude) |
| Max Round Trip Delay (propagation delay only) | Scenario A: 541.46 ms (service and feeder links)<br>Scenario B: 270.73 ms (service link only) | Scenario C: (transparent payload: service and feeder links)<br>25.77 ms (600 km)<br>41.77 ms (1200 km)<br>Scenario D: (regenerative payload: service link only)<br>12.89 ms (600 km)<br>20.89 ms (1200 km) |
| Max differential delay within a cell (Note 6) | 10.3 ms | 3.12 ms and 3.18 ms for respectively 600 km and 1200 km |
| Max Doppler shift (earth fixed user equipment) | 0.93 ppm | 24 ppm (600 km)<br>21 ppm(1200 km) |
| Max Doppler shift variation (earth fixed user equipment) | 0.000 045 ppm/s | 0.27 ppm/s (600 km)<br>0.13 ppm/s(1200 km) |
| User equipment motion on the earth | 1200 km/h (e.g., aircraft) | 500 km/h (e.g., high speed train)<br>Possibly 1200 km/h (e.g., aircraft) |
| User equipment antenna types | Omnidirectional antenna (linear polarisation), assuming 0 dBi<br>Directive antenna (up to 60 cm equivalent aperture diameter in circular polarisation) | |

TABLE 12-continued

| Scenarios | GEO based non-terrestrial access network (Scenario A and B) | LEO based non-terrestrial access network (Scenario C & D) |
| --- | --- | --- |
| User equipment Tx power | Omnidirectional antenna: UE power class 3 with up to 200 mW | |
| | Directive antenna: up to 20 W | |
| User equipment Noise figure | Omnidirectional antenna: 7 dB | |
| | Directive antenna: 1.2 dB | |
| Service link | 3GPP defined New Radio | |
| Feeder link | 3GPP or non-3GPP defined Radio interface | 3GPP or non-3GPP defined Radio interface |

NOTE 1:

Each satellite has the capability to steer beams towards fixed points on earth using beamforming techniques. This is applicable for a period of time corresponding to the visibility time of the satellite

NOTE 2:

Max delay variation within a beam (earth fixed user equipment) is calculated based on Min Elevation angle for both gateway and user equipment

NOTE 3:

Max differential delay within a beam is calculated based on Max beam footprint diameter at nadir

NOTE 4:

Speed of light used for delay calculation is 299792458 m/s.

NOTE 5:

The maximum beam footprint size for GEO is based on current state of the art GEO High Throughput systems, assuming spot beams at the edge of coverage (low elevation).

NOTE 6:

The maximum differential delay at cell level has been computed considering the one at beam level for largest beam size. It does not preclude that cell may include more than one beam when beam size is small or medium size. However the cumulated differential delay of all beams within a cell will not exceed the maximum differential delay at cell level in the table above.

The NTN study results apply to GEO scenarios as well as all NGSO scenarios with circular orbit at altitude greater than or equal to 600 km.

Hereinafter, the NTN reference point will be described.

Figure 11:
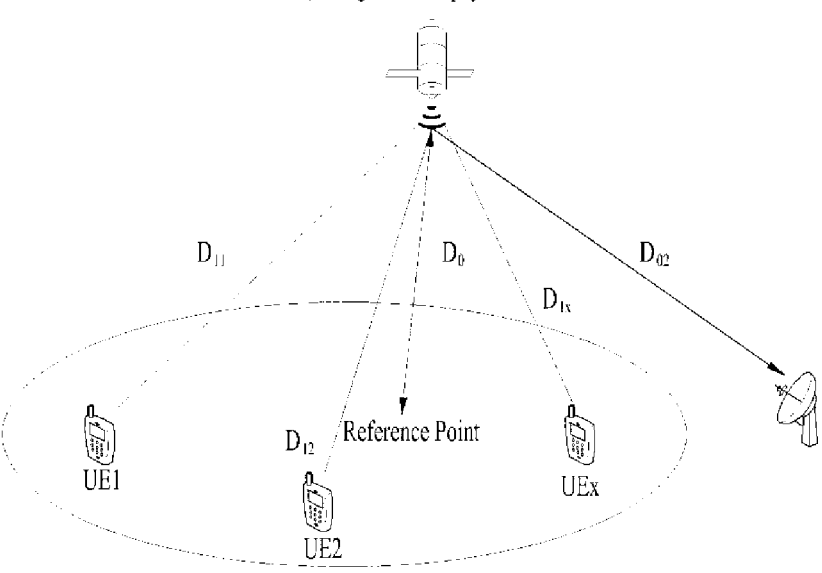
FIG. 11 illustrates TA components of the NTN.

FIG. 11 illustrates TA components of the NTN. Here, the TA offset (NTAoffset) may not be plotted.

With consideration on the larger cell coverage, long round trip time (RTT) and high Doppler, enhancements are considered to ensure the performance for timing and frequency synchronization for UL transmission.

Referring to FIG. 11, a reference point related to timing advance (TA) of initial access and subsequent TA maintenance/management is illustrated. Terms defined in relation to FIG. 11 are described below.

Option 1: Autonomous Acquisition of the TA at UE with UE Known Location and Satellite Ephemeris.

Regarding option 1, the required TA value for UL transmission including PRACH can be calculated by the UE. The corresponding adjustment can be done, either with UE-specific differential TA or full TA (consisting of UE specific differential TA and common TA).

For the full TA compensation at the UE side, both the alignment on the UL timing among UEs and DL and UL frame timing at network side can be achieved. However, in case of satellite with transparent payload, further discussion on how to handle the impact introduced by feeder link will be conducted in normative work. Additional needs for the network to manage the timing offset between the DL and UL frame timing can be considered, if impacts introduced by feeder link is not compensated by UE in corresponding compensation.

For the UE specific differential TA only, additional indication on a single reference point should be signalled to UEs per beam/cell for achieving the UL timing alignment among UEs within the coverage of the same beam/cell. Timing offset between DL and UL frame timing at the network side should also be managed by the network regardless of the satellite payload type.

With concern on the accuracy on the self-calculated TA value at the UE side, additional TA signalling from network to UE for TA refinement, e.g., during initial access and/or TA maintenance, can be determined in the normative work.

Option 2: Timing Advanced Adjustment Based on Network Indication

Regarding option 2, the common TA, which refers to the common component of propagation delay shared by all UEs within the coverage of same satellite beam/cell, is broadcasted by the network per satellite beam/cell. The calculation of this common TA is conducted by the network with assumption on at least a single reference point per satellite beam/cell.

The indication for UE-specific differential TA from network as the Rel-15 TA mechanism is also needed. For satisfying the larger coverage of NTN, extension of value range for TA indication in RAR, either explicitly or implicitly, is identified. Whether to support negative TA value in corresponding indication will be determined in the normative phase. Moreover, indication of timing drift rate, from the network to UE, is also supported to enable the TA adjustment at UE side.

For calculation of common TA in the above two options, single reference point per beam is considered as the baseline. Whether and how to support the multiple reference points can be further discussed in the normative work.

For the UL frequency compensation, at least for LEO system, the following solutions are identified with consideration on the beam specific post-compensation of common frequency offset at the network side:

Regarding option 1, both the estimation and pre-compensation of UE-specific frequency offset are conducted at the UE side. The acquisition of this value can be done by utilizing DL reference signals, UE location and satellite ephemeris.

Regarding option 2, the required frequency offset for UL frequency compensation at least in LEO systems is indicated by the network to UE. The acquisition on this value can be done at the network side with detection of UL signals, e.g., preamble.

Indication of compensated frequency offset values by the network is also supported in case that compensation of the frequency offset is conducted by the network in the uplink and/or the downlink, respectively. However, indication of Doppler drift rate is not necessary.

Hereinafter, more delay-tolerant re-transmission mechanisms will be described in detail.

As follows, two main aspects of a retransmission mechanism with improved delay tolerance can be discussed.

Disabling of HARQ in NR NTN

HARQ optimization in NR-NTN

HARQ Round Trip Time in NR is of the order of several ms. The propagation delays in NTN are much longer, ranging from several milliseconds to hundreds of milliseconds depending on the satellite orbit. The HARQ RTT can be much longer in NTN. It was identified early in the study phase that there would be a need to discuss potential impact and solutions on HARQ procedure. RAN1 has focused on physical layer aspects while RAN2 has focused on MAC layer aspects.

In this regard, disabling of HARQ in NR NTN may be considered.

It was discussed that when UL HARQ feedback is disabled, there could be issues if (i) MAC CE and RRC signalling are not received by UE, or (ii) DL packets not correctly received by UE for a long period of time without gNB knowing it.

The following were discussed without convergence on the necessity of introducing such solutions for NTN when HARQ feedback is disabled (1) Indicate HARQ disabling via DCI in new/re-interpreted field (2) New UCI feedback for reporting DL transmission disruption and or requesting DL scheduling changes The following possible enhancements for slot-aggregation or blind repetitions were considered. There is no convergence on the necessity of introducing such enhancements for NTN.

(1) Greater than 8 slot-aggregation (2) Time-interleaved slot aggregation (3) New MCS table Next, a method for optimizing HARQ for the NR NTN will be described.

Solutions to avoid reduction in peak data rates in NTN were discussed. One solution is to increase the number of HARQ processes to match the longer satellite round trip delay to avoid stop-and-wait in HARQ procedure. Another solution is to disable UL HARQ feedback to avoid stop-and-wait in HARQ procedure and rely on RLC ARQ for reliability. The throughput performance for both types of solutions was evaluated at link level and system level by several contributing companies.

The observations from the evaluations performed on the effect of the number of HARQ processes on performance are summarized as follows:

Three sources provided link-level simulations of throughput versus SNR with the following observations:

One source simulated with a TDL-D suburban channel with elevation angle of 30 degrees with BLER target of 1% for RLC ARQ with 16 HARQ processes, and BLER targets 1% and 10% with 32/64/128/256 HARQ processes. There was no observable gain in throughput with increased number of HARQ processes compared to RLC layer re-transmission with RTT in {32, 64, 128, 256} ms.

One source simulated with a TDL-D suburban channel with elevation angle of 30 degrees with BLER targets of 0.1% for RLC ARQ with 16 HARQ processes, and BLER targets 1% and 10% with 32 HARQ processes. An average throughput gain of 10% was observed with 32 HARQ processes compared to RLC ARQ with 16 HARQ processes with RTT=32 ms.

One source provides the simulation results in following cases with RTT=32 ms, e.g., assuming BLER targets at 1% for RLC ARQ with 16 HARQ processes, BLER targets 1% and 10% with 32 HARQ processes. There is no observable gain in throughput with 32 HARQ processes compared to RLC ARQ with 16 HARQ processes in case that channel is assumed as TDL-D with delay spread/K-factor taken from system channel model in suburban scenario with elevation angle 30. Performance gain can be observed with other channels, especially, up to 12.5% spectral efficiency gain is achieved in case that channel is assumed as TDL-A in suburban with 30° elevation angle. Moreover, simulation based on the simulation with consideration on other scheduling operations: (i) additional MCS offset, (ii) MCS table based on lower efficiency (iii) slot aggregation with different BLER targets are conducted. Significant gain can be observed with enlarging the HARQ process number.

One source provided system level simulations for LEO=1200 km with 20% resource utilization, 16 and 32 HARQ processes, 15 and 20 UEs per cell, proportional fair scheduling, and no frequency re-use. The spectral efficiency gain per user with 32 HARQ processes compared to 16 HARQ processes depends on the number of UEs. With 15 UEs per beam, an average spectral efficiency gain of 12% at 50% per centile is observed. With 20 UEs per cell there is no observable gain.

The following options were considered with no convergence on which option to choose:

Option A: Keep 16 HARQ process IDs and rely on RLC ARQ for HARQ processes with UL HARQ feedback disabled via RRC Option B: Greater than 16 HARQ process IDs with UL HARQ feedback enabled via RRC with following consideration. In this case, in the case of 16 or more HARQ process IDs, maintenance of a 4-bit HARQ process ID field in UE capability and DCI may be considered.

Alternatively, the following solutions may be considered for 16 or more HARQ processes keeping the 4-bit HARQ process ID field in DCI:

Slot number based

Virtual process ID based with HARQ re-transmission timing restrictions

Reuse HARQ process ID within RTD (time window)

Re-interpretation of existing DCI fields with assistance information from higher layers One source also considered solutions where the HARQ process ID field is increased beyond 4 bits With regards to HARQ enhancements for soft buffer management and stop-and-wait time reduction, the following options were considered with no convergence on which, if any, of the options, to choose:

Option A-1: Pre-active/pre-emptive HARQ to reduce stop-and-wait time

Option A-2: Enabling/disabling of HARQ buffer usage configurable on a per UE and per HARQ process Option A-3: HARQ buffer status report from the UE The number of HARQ processes with additional considerations for HARQ feedback, HARQ buffer size, RLC feedback, and RLC ARQ buffer size should be discussed further when specifications are developed.

The configurations (NR frame structure, NTN system, etc.) discussed above may be combined and applied in the contents described below or may be supplemented to clarify the technical features of the methods proposed in the present disclosure. In addition, methods related to HARQ disabling, which will be described later, are related to UL transmission and may be equally applied to the DL signal transmission method in the NR system or LTE system described above. It is to be noted that terms, expressions, structures, and the like defined in each system may be appropriately modified or replaced so that the technical idea proposed in this specification can be implemented in the corresponding system.

HARQ Disabling in NTN

As described above, NR NTN and/or LTE NTN services may be considered to secure a wider coverage or provide wireless communication services in a place where it is not easy to install a BS for wireless communication. The NTN services may be to provide wireless communication services to UEs by installing the BS in places other than the ground such as artificial satellites (geostationary orbit, low orbit, mid-orbit, etc.), airplanes, unmanned airships, drones, etc., rather than installing the BS on the ground. In this case, latency problems may occur due to a delay caused when the UE performs HARQ feedback.

To this end, effective HARQ feedback enabling/disabling methods will be described in the following.

In bands below 6 GHZ, the 2 GHz band (S-band: 2 to 4 GHZ) has been considered as the frequency band for NR NTN services. In bands above 6 GHZ, the DL 20 GHz and UL 30 GHz bands (Ka-band: 26.5 to 40 GHz) have been considered as the frequency band for NR NTN services.

Table 13 summarizes the maximum round trip-delay for each scenario described in Table 12.

TABLE 13

| Scenarios | GEO based non-terrestrial access network (Scenario A and B) | LEO based non-terrestrial access network (Scenario C & D) |
|---|---|---|
| Orbit type | notional station keeping position fixed in terms of elevation/azimuth with respect to a given earth point | circular orbiting around the earth |
| Altitude | 35,786 km | 600 km 1,200 km |
| Max beam footprint size (edge to edge) regardless of the elevation angle | 3500 km (Note 5) | 1000 km |
| Min Elevation angle for both sat-gateway and user equipment | 10° for service link and 10° for feeder link | 10° for service link and 10° for feeder link |
| Max distance between satellite and user equipment at min elevation angle | 40,581 km | 1,932 km (600 km altitude) 3,131 km (1,200 km altitude) |
| Max Round Trip Delay (propagation delay only) | Scenario A: 541.46 ms (service and feeder links) Scenario B: 270.73 ms (service link only) | Scenario C: (transparent payload: service and feeder links) 25.77 ms (600 km) 41.77 ms (1200 km) Scenario D: (regenerative payload: service link only) 12.89 ms (600 km) 20.89 ms (1200 km) |

As shown in Table 13 above, for the worst case delay (for Geo scenario A), the maximum delay may be 540 ms. In this case, there may be an additional delay when the UE performs HARQ feedback, and as a result, latency problems may occur. Accordingly, the following scenarios related to HARQ disabling may be considered.

In these scenarios, enabling/disabling of HARQ feedback may be configured for each UE and each HARQ process.

As described above, when a HARQ process is enabled, it may mean that the HARQ process needs to be performed. When a HARQ process is disabled, it may mean that the HARQ process does not need to be performed.

Scheduling Enhancement when HARQ Feedback is Disabled

Hereinafter, HARQ enhancement methods (more particularly, scheduling enhancement methods) for solving the latency problems caused by a large round-trip delay in the above-described NTN will be described.

The following scenario may be considered for cases where HARQ feedback is disabled. For a DL HARQ process with disabled HARQ feedback, the UE may not expect to receive another PDSCH or slot-aggregated PDSCH for a given HARQ process during [X] after completion of reception of the last PDSCH or slot-aggregated PDSCH for the corresponding HARQ process. The following issues are discussed later: the value of X, the unit for X, and whether TBs of the two PDSCHs should be different.

In the above scenario, if DL HARQ feedback (or process) is disabled, the UE may not expect to receive another PDSCH or slot-aggregated PDSCH before a lapse of [X] time (e.g., symbol, slot, millisecond (msec), etc.) after completion of reception of the last PDSCH or slot-aggregated PDSCH. It may mean that a minimum processing time ([X]) is guaranteed for a disabled HARQ process. Since the minimum processing time may be different depending on the capability of the UE, the UE may report a specific value (Y) to the BS as its capability. In this case, the BS may use the specific value as the minimum processing time based on the reported information (X=Y). Alternatively, the BS may configure or instruct the UE to use as the minimum processing time a value (X=Y+Z) obtained by adding a specific offset (Z) (in units of symbols, slots, msec, etc.) to the specific value. The BS may indicate X=Y+Z or only the offset (Z), or the offset (Z) may be fixed (in the specification).

In this scenario, whether the TBs of the two PDSCHs should be different may be interpreted differently depending on whether blind retransmission is supported (the blind retransmission refers to a method by which the BS performs retransmission (via new data indication (NDI) toggling and/or redundancy version (RV) fields) without receiving HARQ-ACK information from the UE). For example, when blind retransmission is not supported, transmission of each PDSCH may correspond to transmission of a new TB. In this case, the HARQ process ID of DCI scheduling the PDSCH may be disabled, or the number of IDs may be one. If the disabled ID is automatically indicated, the NDI and RV fields may be unnecessary. Thus, the UE may ignore the NDI/RV fields in the DCI indicating the disabled HARQ process. Alternatively, the NDI/RV fields may be converted to other uses (e.g., to indicate the number of times that slot aggregation is repeated), or no field may be configured (that is, compact DCI may be configured). On the other hand, when blind retransmission is supported, one or more disabled HARQ process IDs may be required. In this case, the NDI and RV fields may be required to indicate retransmission. Accordingly, the UE may operate by interpreting/applying the NDI and/or RV field in the DCI based on the current NR operation. That is, the UE may interpret/apply the HARQ related fields (e.g., NDI field and RV field) differently depending on the number of scheduled disabled HARQ processes and/or whether blind retransmission is indicated.

Figure 12:
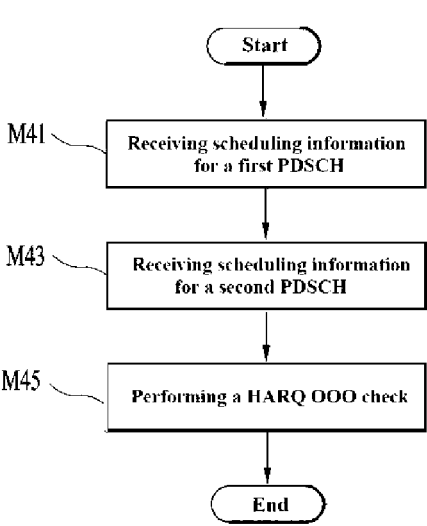
FIG. 12 is a diagram for explaining a method for a UE to evaluate the effectiveness of HARQ.

FIG. 12 is a diagram for explaining a method for the UE to evaluate the effectiveness of HARQ.

The UE may be scheduled with a plurality of PDSCHs in a plurality of pieces of scheduling information. For convenience of explanation, it is assumed that the UE receives first scheduling information for scheduling a first PDSCH and second scheduling information for scheduling a second PDSCH.

Referring to FIG. 12, the UE may receive first scheduling information for scheduling a first PDSCH (M41). The UE may receive second scheduling information for scheduling a second PDSCH (M43). The UE may check HARQ out-of-order (OOO) constraint (or evaluate the effectiveness of a HARQ process) based on the first scheduling information and second scheduling information (M45).

Specifically, scenarios related to the HARQ OOO constraint may be defined as shown in Table 14 below.

TABLE 14

A UE shall upon detection of a PDCCH with a configured DCI format 1_0, 1_1 or 1_2 decode the corresponding PDSCHs as indicated by that DCI. For any HARQ process ID(s) in a given scheduled cell, the UE is not expected to receive a PDSCH that overlaps in time with another PDSCH. The UE is not expected to receive another PDSCH for a given HARQ process until after the end of the expected transmission of HARQ-ACK for that HARQ process, where the timing is given by Clause 9.2.3 of [6]. In a given scheduled cell, the UE is not expected to receive a first PDSCH and a second PDSCH, starting later than the first PDSCH, with its corresponding HARQ-ACK assigned to be transmitted on a resource ending before the start of a different resource for the HARQ-ACK assigned to be transmitted for the first PDSCH, where the two resources are in different slots for the associated HARQ-ACK transmissions, each slot is composed of $N_{sym}^{slot}$ symbols [4] or a number of symbols indicated by subslotLengthForPUCCH-r16 if provided, and the HARQ-ACK for the two PDSCHs are associated with the HARQ-ACK codebook of the same priority. In a given scheduled cell, the UE is not expected to receive a first PDSCH, and a second PDSCH, starting later than the first PDSCH, with its corresponding HARQ-ACK assigned to be transmitted on a resource ending before the start of a different resource for the HARQ-ACK assigned to be transmitted for the first PDSCH if the HARQ-ACK for the two PDSCHs are associated with HARQ-ACK codebooks of different priorities. For any two HARQ process IDs in a given scheduled cell, if the UE is scheduled to start receiving a first PDSCH starting in symbol j by a PDCCH ending in symbol i, the UE is not expected to be scheduled to receive a PDSCH starting earlier than the end of the first PDSCH with a PDCCH that ends later than symbol i. In a given scheduled cell, for any PDSCH corresponding to SI-RNTI, the UE is not expected to decode a re-transmission of an earlier PDSCH with a starting symbol less than N symbols after the last symbol of that PDSCH, where the value of N depends on the PDSCH subcarrier spacing configuration u, with N=13 for μ=0, N=13 for μ=1, N=20 for μ=2, and N=24 for μ=3.

Referring to Table 14 above, for the same HARQ ID, the UE may not expect to be scheduled with another PDSCH (with the same HARQ ID in DCI) until the UE transmits a HARQ-ACK for previous PDSCH transmission. In the above operation, it is assumed that all HARQ feedback is enabled. If HARQ feedback is disabled, the UE may not expect to receive another PDSCH or slot-aggregated PDSCH before a lapse of [X] time (e.g., symbol, slot, msec, etc.) after completion of reception of the last PDSCH or slot-aggregated PDSCH by considering the specific minimum processing time or gap ([X]) as in the above scenario.

Regarding the OOO constraint for different HARQ IDs (for any two HARQ process IDs), if the first PDSCH is transmitted (scheduled) in slot n and the second PDSCH is transmitted (scheduled) in slot (n+k), the time of transmitting an ACK/NACK for the second PDSCH should not be earlier than the time of transmitting an ACK/NACK for the first PDSCH. In this case, if one HARQ process ID is enabled and the other HARQ process ID is disabled, there may be ambiguity regarding the UE operation. To resolve the ambiguity, at least one of 1) to 3) below may be considered.

1) When the first PDSCH (enabled) is scheduled in slot n and the second PDSCH (disabled) is scheduled in slot (n+k), the UE needs to transmit ACK/NACK feedback for the first PDSCH. In this case, the time of checking the HARQ OOO in relation to the second PDSCH may be ambiguous. To resolve the ambiguity, operations described in ① and/or ② may be considered.

① To check the HARQ OOO in relation to the second PDSCH, a virtual/default ACK/NACK transmission timing may be considered.

i) Despite the disabled HARQ process, the BS may indicate the virtual/default ACK/NACK transmission timing using a specific field (e.g., K1 (PDSCH-to-HARQ_feedback timing indicator) field, NDI field, RV field, etc.) in DCI scheduling the second PDSCH. Additionally/alternatively, a field (or timing field) for the virtual feedback transmission timing may be newly defined in the DCI scheduling the second PDSCH, and the virtual/default ACK/NACK transmission timing may be indicated by the newly defined field in the DCI.

ii) Alternatively, the virtual/default ACK/NACK transmission timing may be determined based on a specific K1 value (e.g., maximum or minimum) among a plurality of K1 values configured for the UE.

iii) Alternatively, a specific timing offset ([Y]) may be considered. That is, the UE may expect that the time of transmitting the ACK/NACK for the first PDSCH is before slot (n+k+Y). In this case, the value of Y may correspond to a value reported as the capability of the UE, a value configured by the BS based on the reported capability, or a predetermined value (e.g., $T_{proc,1}$, which is calculated according to Equation 1).

② The UE may drop (pass) the OOO check for the first and second PDSCHs as described above. In this case, the UE may expect that the time interval between the first and second PDSCHs is scheduled to be greater than or equal to a specific value.

For example, when the first and second PDSCHs are scheduled such that the time interval therebetween is less than the specific value, the UE may receive only one of the first and second PDSCHs based on the scheduled time. For example, the UE may receive only a first scheduled PDSCH among the first and second PDSCHs or receive only a PDSCH scheduled later among the first and second PDSCHs. Alternatively, the UE may ignore either DCI for the first PDSCH or DCI for the second PDSCH based on the scheduled time. Alternatively, the UE may drop reception of both the PDSCHs (or ignore all DCI scheduling the two PDSCHs).

2) When the first PDSCH (disabled) is scheduled in slot n and the second PDSCH (enabled) is scheduled in slot (n+k), the UE needs to transmit ACK/NACK feedback for the second PDSCH. To this end, A, B and/or C below may be considered.

① The UE may perform the OOO check for the second PDSCH with respect to the ACK/NACK timing of the second PDSCH (the timing indicated by the K1 field of the DCI scheduling the second PDSCH) by assuming/considering that the ACK/NACK transmission timing of the first PDSCH as [X]. In this case, X may be a value reported as the capability of the UE, a value configured by the BS based on the capability, or a predetermined value (e.g., $T_{proc,1}$).

i) The virtual/default ACK/NACK transmission timing may be indicated by a specific field (e.g., K1, NDI, RV, etc.) in DCI scheduling the first PDSCH.

ii) Alternatively, the virtual/default ACK/NACK transmission timing may be determined based on a specific K1 value (e.g., maximum or minimum) among a plurality of K1 values configured for the UE.

② The UE may drop (pass) the OOO check for the second PDSCH. Accordingly, the value of X may be regarded to be zero.

③ The UE may drop (pass) the OOO check for the first and second PDSCHs as described above. In this case, the UE may expect that the time interval between the first and second PDSCHs is scheduled to be greater than or equal to a specific value.

For example, when the first and second PDSCHs are scheduled such that the time interval therebetween is less than the specific value, the UE may receive only one of the first and second PDSCHs based on the scheduled time. For example, the UE may receive only a first scheduled PDSCH among the first and second PDSCHs or receive only a PDSCH scheduled later among the first and second PDSCHs. Alternatively, the UE may ignore either DCI for the first PDSCH or DCI for the second PDSCH based on the scheduled time. Alternatively, the UE may drop reception of both the PDSCHs (or ignore all DCI scheduling the two PDSCHs).

3) When the first PDSCH (disabled) is scheduled in slot n and the second PDSCH (disabled) is scheduled in slot (n+k), the UE may perform the OOO check based on A, B and/or C below.

① The UE may perform the OOO check for the second PDSCH by considering the ACK/NACK transmission timing of the first PDSCH as [X] and the ACK/NACK transmission timing of the second PDSCH as [Y]. In this case, each of X and Y may be a value reported as the capability of the UE, a value configured by the BS based on the capability, or a predetermined value. For example, i) X and Y may have the same value (e.g., $T_{proc,1}$) for all disabled HARQ processes, or X and Y may have different values depending on the scheduling flexibility or UE capability. Alternatively, ii) X and Y may be indicated by unused fields (e.g., K1, NDI, and RV fields) in DCI1 and DCI2 scheduling the first and second PDSCHs, respectively.

② The UE may drop (pass) the OOO check for the first and second PDSCHs. Accordingly, the values of X and/or Y may be regarded to be zero.

③ The UE may drop (pass) the OOO check for the first and second PDSCHs as described above. In this case, the UE may expect that the time interval between the first and second PDSCHs is scheduled to be greater than or equal to a specific value.

For example, when the first and second PDSCHs are scheduled such that the time interval therebetween is less than the specific value, the UE may receive only one of the first and second PDSCHs based on the scheduled time. For example, the UE may receive only a first scheduled PDSCH among the first and second PDSCHs or receive only a PDSCH scheduled later among the first and second PDSCHs. Alternatively, the UE may ignore either DCI for the first PDSCH or DCI for the second PDSCH based on the scheduled time. Alternatively, the UE may drop reception of both the PDSCHs (or ignore all DCI scheduling the two PDSCHs).

Figure 13:
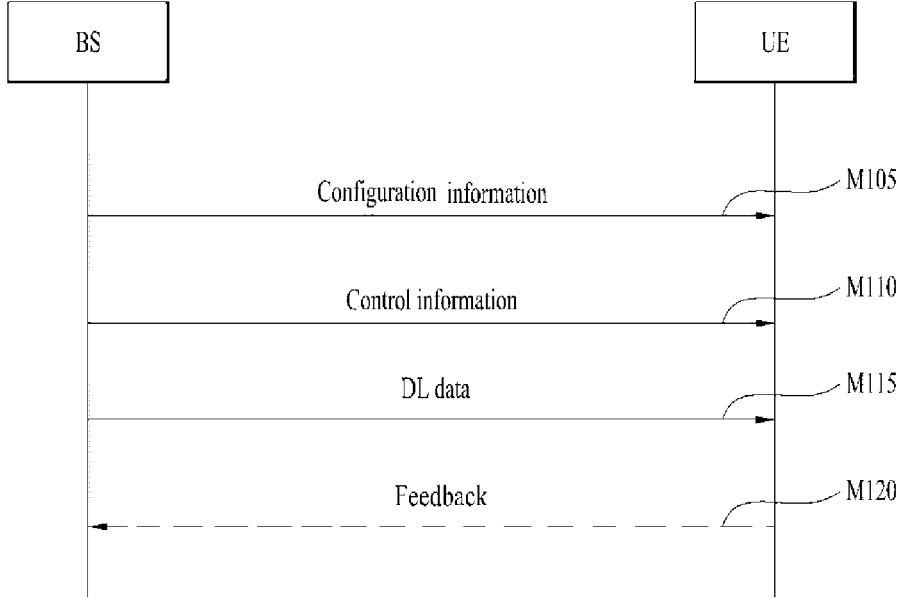
FIG. 13 is a flowchart illustrating a method of performing signaling between a BS and a UE based on embodiments.

FIG. 13 is a flowchart illustrating a method of performing signaling between the BS and UE based on the above-described embodiments.

In an NTN, the default HARQ operation mode of the UE may be configured in a step before the RRC connection/configuration, which is not shown in FIG. 13. For example, when it is indicated over a physical broadcast channel (PBCH) (or master information block (MIB) or a system information block (SIB) that the cell accessed by the UE is an NTN cell, the UE may set the default mode to HARQ-disabled. Alternatively, one of a HARQ-disabled configuration and HARQ-enabled configuration(s) may be indicated as the default HARQ operation mode over a PBCH (MIB) or SIB (for example, when the NTN cell is indicated).

Referring to FIG. 13, the UE may receive configuration information from the BS (M105). The configuration information may include NTN related configuration information/configuration information for DL transmission and reception (e.g., PDCCH-config, PDSCH-config, etc.), HARQ process related configurations (e.g., whether HARQ feedback is enabled/disabled, the number of HARQ processes, etc.), CSI report related configurations (e.g., CSI report config, CSI report quantity, CSI-RS resource config, etc.), and so on. For example, the configuration information may be transmitted through higher layer (e.g., RRC or MAC CE) signaling. Alternatively, whether the HARQ feedback is enabled/disabled may be configured for each cell group. Alternatively, whether the HARQ feedback is enabled/disabled may be configured by information such as a bitmap.

Alternatively, the configuration information may include configurations related to an aggregation factor/repetitive PDSCH transmission (e.g., the number of repetitions, repetition pattern, repetition step size, etc.). For example, the configuration information may include a parameter, dl-DataToUL-ACK. The configuration information may indicate a plurality of integer values from 0 to 31 based on the parameter dl-DataToUL-ACK.

Next, the UE may receive control information from the BS (M110). The control information may be transmitted/received in DCI. Alternatively, the control information may include scheduling information for transmission and reception of DL data/channel, resource allocation information, HARQ feedback related information (e.g., NDI, RV, HARQ process number, downlink assignment index, transmission power control (TPC) command for scheduled PUCCH, PUCCH resource indicator, PDSCH-to-HARQ_feedback timing indicator, etc.), an MCS, frequency domain resource assignment, etc. Alternatively, the DCI may be either DCI format 1_0 or DCI format 1_1. Alternatively, the DCI may include an aggregation level (and/or repetition factor). For example, the number of HARQ processes may be set to 16 or higher, and HARQ process IDs may be identified based on a HARQ process number field included in the DCI and the index of a control channel element/resource block (CCE/RB) associated with the DCI.

Alternatively, as described above with reference to FIG. 12, the UE may receive first DCI for a first PDSCH and second DCI for a second PDSCH. In this case, the UE may perform a HARQ OOO check based on the scheduling information on each of the first and second PDSCHs. For example, the second PDSCH may be scheduled to be transmitted after the first PDSCH, and the HARQ process for at least one of the first or second PDSCH may be disabled. In this case, the UE may determine a virtual HARQ ACK transmission timing based on at least one of 1) to 3) described above. Alternatively, the UE may determine whether the second PDSCH is scheduled before X or Y, or the UE may drop the HARQ OOO check. When the UE drops the HARQ OOO check, the UE may expect that the interval between a first reception time of the scheduled first PDSCH and a second reception time of the scheduled second PDSCH is greater than or equal to a specific value. When the interval between the first and second reception times is less than the specific value, the UE may receive only one of the first and second PDSCHs (and/or receive either the first DCI or the second DCI). Alternatively, the UE may ignore or drop reception of both the first and second PDSCHs based on the relationship between the first and second reception times or the relationship between the reception time of the first DCI and the reception time of the second DCI Then, the UE may receive the DL data/channel (or PDSCH) from the BS (M115). That is, the UE may receive the DL data/channel scheduled by the control information or DCI. The DL data/channel may be transmitted and received based on the above-described configuration information. Alternatively, the DL data/channel may be transmitted and received according to the above-described method. For example, the UE may receive at least one PDSCH of the first or second PDSCH based on the HARQ OOO check or may drop the reception of both the first and second PDSCHs.

Next, the UE may determine whether to transmit a feedback signal based on HARQ processes configured for the DL data/channel (M120). For example, when the HARQ process for the first PDSCH is enabled and the HARQ process for the second PDSCH is disabled, the UE may transmit a feedback signal for the first PDSCH without transmitting a feedback signal for the second PDSCH.

The BS may mean a generic term for objects that transmit and receive data to and from the UE. For example, the BS may be a concept including one or more transmission points (TPs) and one or more transmission and reception points (TRPs). The TP and/or TRP may include a panel, a transmission and reception unit, etc. of the BS. In addition, the term "TRP" may be replaced with a panel, antenna array, cell (e.g., macro cell/small cell/pico cell, etc.), TP, BS (base station, gNB, etc.), and so on. As described above, the TRP may be identified according to information (e.g., index, ID) on a CORESET group (or CORESET pool). For example, when one UE is configured to transmit and receive with multiple TRPs (or cells), it may mean that multiple CORESET groups (or CORESET pools) are configured for the one UE. The configuration of such a CORESET group (or CORESET pool) may be performed through higher layer signaling (e.g., RRC signaling, etc.).

Figure 14:
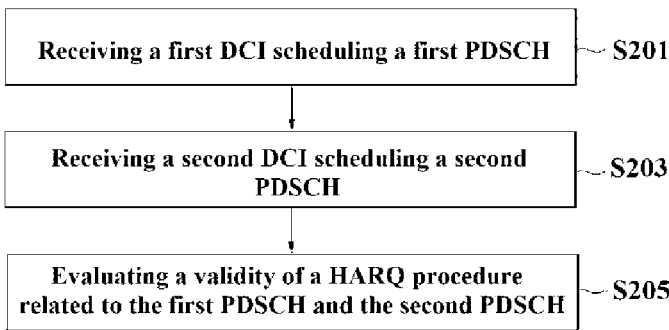
FIG. 14 is a diagram for explaining a method for a UE to evaluate the effectiveness of a HARQ process.

FIG. 14 is a diagram for explaining a method for the UE to evaluate the effectiveness of a HARQ process.

Referring to FIG. 14, the UE may receive first DCI scheduling a first PDSCH from the BS (S201). In addition, the UE may receive second DCI scheduling a second PDSCH (S203). For example, the first PDSCH may be scheduled to be transmitted by the BS in slot n, and the second PDSCH may be scheduled to be transmitted by the BS in slot (n+k).

Each of the first and second PDSCHs may be a PDSCH for communication with an NTN. That is, the first and second DCI may schedule the first and second PDSCHs related to the NTN, respectively. For communication with the NTN, a HARQ process is likely to be disabled due to a fairly large RTT, and as a result, ambiguity may occur.

Thereafter, the UE may evaluate the effectiveness of the HARQ process (or check the above-described HARQ OOO constraint) based on the feedback transmission timing of each of the first and second PDSCHs (S205). For example, the UE may estimate whether the transmission timing of a feedback signal (ACK/NACK) for reception of the second PDSCH is earlier than the transmission timing of a feedback signal (ACK/NACK) for reception of the first PDSCH. For example, the UE may expect that the second PDSCH is scheduled such that the transmission timing of the feedback signal (ACK/NACK) for reception of the second PDSCH is not earlier than the transmission timing of the feedback signal (ACK/NACK) for reception of the first PDSCH.

Different HARQ process IDs may be configured for the first and second PDSCHs. In this case, a HARQ process for at least one of the first and second PDSCHs may be configured to be disabled. When the HARQ process for at least one of the first and second PDSCHs is disabled, it may be difficult to specify the transmission timing (feedback transmission timing) of a feedback signal for the at least one PDSCH, and thus there may be ambiguity in evaluating the effectiveness. In this case, as described with reference to FIGS. 12 and 13, the UE may resolve the ambiguity in the effectiveness evaluation by defining or configuring a virtual feedback transmission timing for the at least one PDSCH. Hereinafter, it is assumed that different HARQ process IDs are configured for the first and second PDSCHs. The HARQ process IDs of the first and second PDSCH and/or whether the HARQ processes thereof are enabled or disabled may be indicated or configured over RRC signaling and/or DCI.

Specifically, when the HARQ process for one of the first and second PDSCHs is disabled, the UE may configure or determine the virtual feedback transmission timing for the one PDSCH in determining the effectiveness. The virtual feedback transmission timing may be configured based on a specific value included in DCI scheduling the one PDSCH. For example, the UE may obtain the specific value from an NDI field, a K1 field (i.e., PDSCH-to-HARQ_feedback timing indicator field), or an RV field included in the DCI. The UE may configure or determine the virtual feedback transmission timing based on the obtained specific value. Alternatively, a field (or timing field) for the virtual feedback transmission timing may be newly defined in the DCI scheduling the disabled PDSCH, and the virtual/default ACK/NACK transmission timing may be indicated by the newly defined field in the DCI.

That is, the UE may receive the virtual feedback transmission timing through the NDI field, RV field, K1 field (fields that are not used when a HARQ process is disabled) and/or newly defined field in the DCI (the virtual feedback transmission timing may be indicated by a combination of values that are not valid for each field). For example, the specific value may be obtained from at least one of the K1 field, NDI field, or RV field that are not used in the DCI related with the disabled HARQ process.

Alternatively, the UE may configure or determine the virtual feedback transmission timing based on a maximum or minimum value among a plurality of K1 values configured for the UE. Alternatively, the virtual feedback transmission timing may be configured based on a timing offset related to the processing time, which is reported as information on the capability of the UE. Alternatively, the virtual feedback transmission timing may be configured or determined based on a timing offset configured or indicated by the BS based on the capability information reported by the UE. Alternatively, the virtual feedback transmission timing may be preconfigured based on $T_{proc,1}$, which is predefined as described above.

For example, if the HARQ process for the first PDSCH among the first and second PDSCHs is disabled, the UE may perform the effectiveness evaluation based on the feedback transmission timing of the first PDSCH and the virtual feedback transmission timing of the second PDSCH (which is configured as described above). That is, the UE may perform the effectiveness evaluation based on whether the virtual feedback transmission timing configured or determined for the second PDSCH is earlier than the feedback transmission timing of the first PDSCH. When the virtual feedback transmission timing is earlier than the feedback transmission timing, the UE may ignore scheduling for the two PDSCHs. Alternatively, the UE may consider that only scheduling for one of the two PDSCHs is effective, based on the scheduled timing.

For example, if the HARQ process for the second PDSCH among the first and second PDSCHs is disabled, the UE may perform the effectiveness evaluation based on the feedback transmission timing of the second PDSCH and the virtual feedback transmission timing of the first PDSCH (which is configured as described above). That is, the UE may perform the effectiveness evaluation based on whether the feedback transmission timing of the second PDSCH is earlier than the virtual feedback transmission timing configured or determined for the first PDSCH. When the HARQ processes for both the first and second PDSCHs are configured to be disabled, the UE may perform the effectiveness evaluation based on a first virtual feedback transmission timing determined for the first PDSCH and a second virtual feedback transmission timing configured or determined for the second PDSCH.

Figure 15:
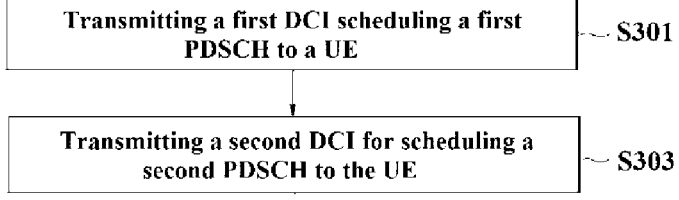
FIG. 15 is a diagram for explaining a method for a BS to schedule a first PDSCH and a second PDSCH to a UE.

FIG. 15 is a diagram for explaining a method for the BS to schedule a first PDSCH and a second PDSCH to the UE.

Referring to FIG. 15, the BS may transmit first DCI scheduling the first PDSCH to the UE (S301). In addition, the BS may transmit second DCI scheduling the second PDSCH (S303). As described above, the first PDSCH may be scheduled to be transmitted by the BS in slot n, and the second PDSCH may be scheduled to be transmitted by the BS in slot (n+k).

Each of the first and second PDSCHs may be a PDSCH for communication with an NTN. That is, the first and second DCI may schedule the first and second PDSCHs related to the NTN, respectively. For communication with the NTN, a HARQ process is likely to be disabled due to a fairly large RTT, and thus, ambiguity may occur as follows.

Since the UE expects that the second PDSCH is scheduled such that the transmission timing of a feedback signal (ACK/NACK) for reception of the second PDSCH is not earlier than the transmission timing of a feedback signal (ACK/NACK) for reception of the first PDSCH, the BS may schedule the first and second PDSCHs in consideration of the transmission timing of the feedback signal (ACK/NACK) of the first PDSCH and the transmission timing of the feedback signal (ACK/NACK) of the second PDSCH of the UE.

Different HARQ process IDs may be configured for the first and second PDSCHs. In this case, a HARQ process for at least one of the first and second PDSCHs may be configured to be disabled. When the HARQ process for at least one of the first and second PDSCHs is disabled, it may be difficult to specify the transmission timing (feedback transmission timing) of a feedback signal for the at least one PDSCH. In this case, as described with reference to FIGS. 12 and 13, the BS may schedule the first and second PDSCHs in consideration of a virtual feedback transmission timing for the at least one PDSCH (or a virtual feedback transmission timing to be configured or determined from the perspective of the UE).

As described above, in determining the effectiveness of constraint on HARQ feedback timings (i.e., HARQ OOO), a separate virtual feedback transmission timing may be defined for one PDSCH having a disabled HARQ process configured therefor where no feedback transmission timing is specified, thereby resolving ambiguity that may occur in the effectiveness determination.

In addition, when there is no constraint on HARQ feedback timings (i.e., HARQ 000), if scheduling information for scheduling two PDSCHs is received within a predetermined specific offset, effective PDSCH scheduling may be selected in consideration of the reception timings of the scheduling information scheduling the two PDSCHs or the scheduling timings of the two PDSCHs, thereby minimizing unnecessary waste of resources.

Communication System Example to which the Present Disclosure is Applied

Although not limited thereto, various descriptions, functions, procedures, proposals, methods, and/or operational flow charts of the present disclosure disclosed in this document may be applied to various fields requiring wireless communication/connection (5G) between devices.

Hereinafter, it will be illustrated in more detail with reference to the drawings. In the following drawings/description, the same reference numerals may exemplify the same or corresponding hardware blocks, software blocks, or functional blocks, unless otherwise indicated.

Figure 16:
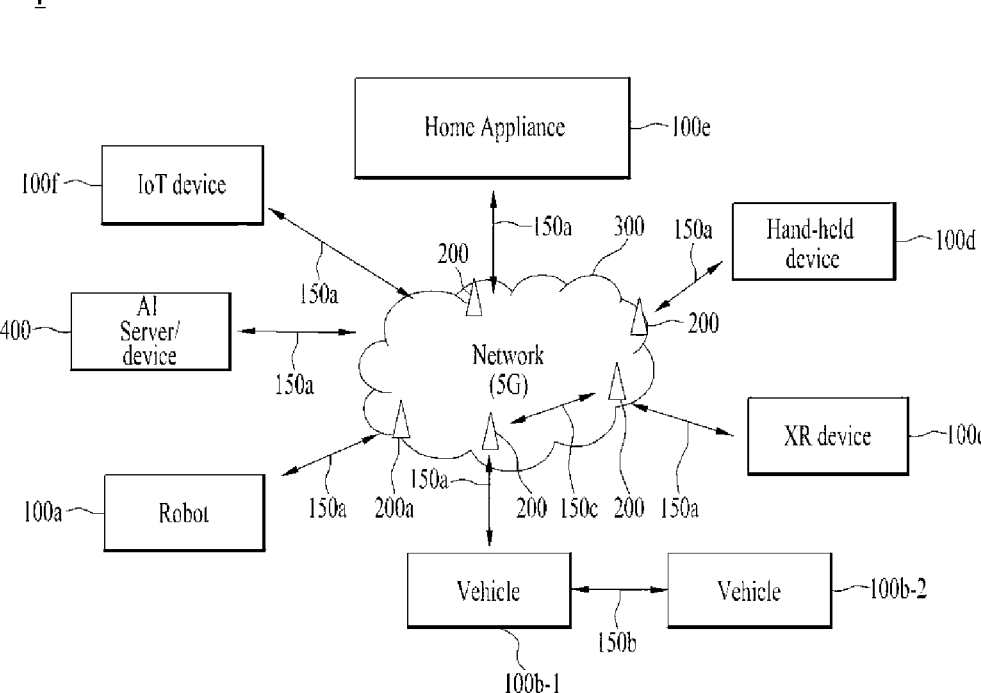
FIG. 16 illustrates a communication system applied to the present disclosure.

FIG. 16 illustrates a communication system applied to the present disclosure.

Referring to FIG. 16, a communication system 1 applied to the present disclosure includes wireless devices, Base Stations (BSs), and a network. Herein, the wireless devices represent devices performing communication using Radio Access Technology (RAT) (e.g., 5G New RAT (NR)) or Long-Term Evolution (LTE)) and may be referred to as communication/radio/5G devices. The wireless devices may include, without being limited to, a robot 100a, vehicles 100b-1 and 100b-2, an extended Reality (XR) device 100c, a hand-held device 100d, a home appliance 100e, an Internet of Things (IoT) device 100f, and an Artificial Intelligence (AI) device/server 400. For example, the vehicles may include a vehicle having a wireless communication function, an autonomous driving vehicle, and a vehicle capable of performing communication between vehicles. Herein, the vehicles may include an Unmanned Aerial Vehicle (UAV) (e.g., a drone). The XR device may include an Augmented Reality (AR)/Virtual Reality (VR)/Mixed Reality (MR) device and may be implemented in the form of a Head-Mounted Device (HMD), a Head-Up Display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter. For example, the BSs and the network may be implemented as wireless devices and a specific wireless device 200a may operate as a BS/network node with respect to other wireless devices.

The wireless devices 100a to 100f may be connected to the network 300 via the BSs 200. An AI technology may be applied to the wireless devices 100a to 100f and the wireless devices 100a to 100f may be connected to the AI server 400 via the network 300. The network 300 may be configured using a 3G network, a 4G (e.g., LTE) network, or a 5G (e.g., NR) network. Although the wireless devices 100a to 100f may communicate with each other through the BSs 200/network 300, the wireless devices 100a to 100f may perform direct communication (e.g., sidelink communication) with each other without passing through the BSs/network. For example, the vehicles 100b-1 and 100b-2 may perform direct communication (e.g., Vehicle-to-Vehicle (V2V)/Vehicle-to-everything (V2X) communication). The IoT device (e.g., a sensor) may perform direct communication with other IoT devices (e.g., sensors) or other wireless devices 100a to 100f.

Wireless communication/connections 150a, 150b, or 150c may be established between the wireless devices 100a to 100f/BS 200, or BS 200/BS 200. Herein, the wireless communication/connections may be established through various RATs (e.g., 5G NR) such as uplink/downlink communication 150a, sidelink communication 150b (or, D2D communication), or inter BS communication (e.g., relay, Integrated Access Backhaul (IAB)). The wireless devices and the BSs/the wireless devices may transmit/receive radio signals to/from each other through the wireless communication/connections 150a and 150b. For example, the wireless communication/connections 150a and 150b may transmit/receive signals through various physical channels. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the present disclosure.

Examples of Wireless Devices to which the Present Disclosure is Applied

Figure 17:
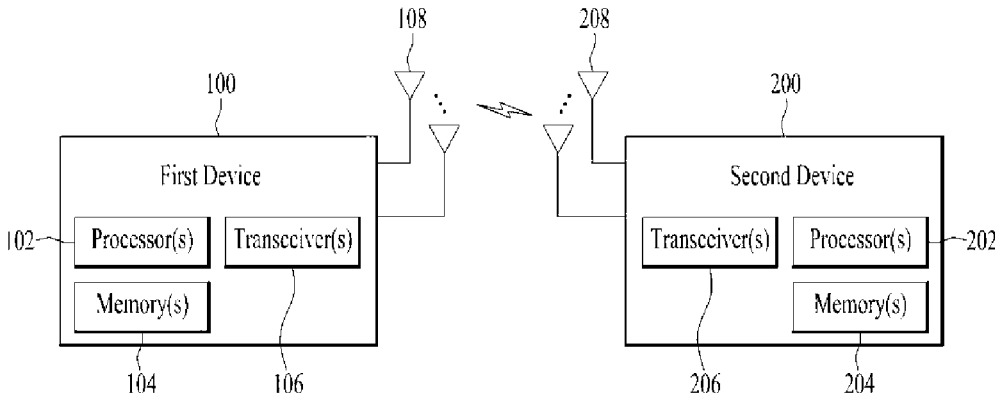
FIG. 17 illustrates wireless devices applicable to the present disclosure.

FIG. 17 illustrates a wireless device applicable to the present disclosure.

Referring to FIG. 17, a first wireless device 100 and a second wireless device 200 may transmit radio signals through a variety of RATs (e.g., LTE and NR). Herein, {the first wireless device 100 and the second wireless device 200} may correspond to {the wireless device 100x and the BS 200} and/or {the wireless device 100x and the wireless device 100x} of FIG. 16.

The first wireless device 100 may include one or more processors 102 and one or more memories 104 and additionally further include one or more transceivers 106 and/or one or more antennas 108. The processor(s) 102 may control the memory(s) 104 and/or the transceiver(s) 106 and may be configured to implement the descriptions, functions, procedures, proposals, methods, and/or operational flowcharts disclosed in this document. For example, the processor(s) 102 may process information within the memory(s) 104 to generate first information/signals and then transmit radio signals including the first information/signals through the transceiver(s) 106. The processor(s) 102 may receive radio signals including second information/signals through the transceiver 106 and then store information acquired by processing the second information/signals in the memory(s) 104. The memory(s) 104 may be connected to the processor(s) 102 and may store a variety of information related to operations of the processor(s) 102. For example, the memory(s) 104 may store software code including commands for performing a part or the entirety of processes controlled by the processor(s) 102 or for performing the descriptions, functions, procedures, proposals, methods, and/or operational flowcharts disclosed in this document. Herein, the processor(s) 102 and the memory(s) 104 may be a part of a communication modem/circuit/chip designed to implement RAT (e.g., LTE or NR). The transceiver(s) 106 may be connected to the processor(s) 102 and transmit and/or receive radio signals through one or more antennas 108. Each of the transceiver(s) 106 may include a transmitter and/or a receiver. The transceiver(s) 106 may be interchangeably used with Radio Frequency (RF) unit(s). In the present disclosure, the wireless device may represent a communication modem/circuit/chip.

According to an embodiment, the first wireless device 100 or UE may include the processor(s) 102 connected to the transceiver(s) 106 and the memory(s) 104. The memory(s) 104 may include at least one program for performing operations related to the embodiments described above with reference to FIGS. 11 to 15.

Specifically, the processor(s) 102 may be configured to control the transceiver(s) 106 to receive first DCI scheduling a first PDSCH; control the transceiver(s) 106 to receive second DCI scheduling a second PDSCH; and evaluate the effectiveness of a HARQ process based on a feedback transmission timing for each of the first and second PDSCHs. The first and second PDSCHs may be configured with different HARQ process IDs. Based on that the HARQ process for one of the first and second PDSCHs is disabled, the processor may be configured to evaluate the effectiveness by configuring a virtual feedback transmission timing for the one PDSCH.

Alternatively, a chipset including the processor(s) 102 and the memory(s) 104 may be configured. The chipset may include: at least one processor; and at least one memory operably connected to the at least one processor and configured to, when executed, cause the at least one processor to perform operations. The operations may include: receiving first DCI scheduling a first PDSCH; receiving second DCI scheduling a second PDSCH: evaluating the effectiveness of a HARQ process based on a feedback transmission timing for each of the first and second PDSCHs; and based on that the HARQ process for one of the first and second PDSCHs is disabled, evaluating the effectiveness by configuring a virtual feedback transmission timing for the one PDSCH. The first and second PDSCHs may be configured with different HARQ process IDs. In addition, the at least one processor may perform operations related to the embodiments described with reference to FIGS. 11 to 15 based on a program included in the memory.

Alternatively, there may be provided a computer-readable storage medium including at least one computer program configured to cause at least one processor to perform operations. The at least one computer program may be configured to cause the at least one processor to perform operations for evaluating effectiveness, and the at least one computer program may be stored on the computer-readable storage medium. The operations may include: receiving first DCI scheduling a first PDSCH: receiving second DCI scheduling a second PDSCH: evaluating the effectiveness of a HARQ process based on a feedback transmission timing for each of the first and second PDSCHs; and based on that the HARQ process for one of the first and second PDSCHs is disabled, evaluating the effectiveness by configuring a virtual feedback transmission timing for the one PDSCH. The first and second PDSCHs may be configured with different HARQ process IDs. In addition, the computer program may include programs for performing operations related to the embodiments described in FIGS. 11 to 15.

The second wireless device 200 may include one or more processors 202 and one or more memories 204 and additionally further include one or more transceivers 206 and/or one or more antennas 208. The processor(s) 202 may control the memory(s) 204 and/or the transceiver(s) 206 and may be configured to implement the descriptions, functions, procedures, proposals, methods, and/or operational flowcharts disclosed in this document. For example, the processor(s) 202 may process information within the memory(s) 204 to generate third information/signals and then transmit radio signals including the third information/signals through the transceiver(s) 206. The processor(s) 202 may receive radio signals including fourth information/signals through the transceiver(s) 106 and then store information acquired by processing the fourth information/signals in the memory(s) 204. The memory(s) 204 may be connected to the processor(s) 202 and may store a variety of information related to operations of the processor(s) 202. For example, the memory(s) 204 may store software code including commands for performing a part or the entirety of processes controlled by the processor(s) 202 or for performing the descriptions, functions, procedures, proposals, methods, and/or operational flowcharts disclosed in this document. Herein, the processor(s) 202 and the memory(s) 204 may be a part of a communication modem/circuit/chip designed to implement RAT (e.g., LTE or NR). The transceiver(s) 206 may be connected to the processor(s) 202 and transmit and/or receive radio signals through one or more antennas 208. Each of the transceiver(s) 206 may include a transmitter and/or a receiver. The transceiver(s) 206 may be interchangeably used with RF unit(s). In the present disclosure, the wireless device may represent a communication modem/circuit/chip.

According to one embodiment, the BS or NTN may include the processor(s) 202, the memory(s) 204, and/or the transceiver(s) 206. The processor(s) 202 may be configured to control the transceiver(s) 206 or RF transceiver to: transmit first DCI scheduling a first PDSCH; and transmit second DCI scheduling a second PDSCH. The first and second PDSCHs may be configured with different HARQ process IDs. Based on that a HARQ process for the second PDSCH is disabled, the first PDSCH and the second PDSCH may be scheduled such that a virtual feedback transmission timing for the second PDSCH is not earlier than a feedback transmission timing for the first PDSCH. In addition, the processor(s) 202 may perform the above-described operations based on the memory(s) 204 including at least one program for performing operations related to the embodiments described with reference to FIGS. 11 to 15.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as PHY, MAC, RLC, PDCP, RRC, and SDAP). The one or more processors 102 and 202 may generate one or more Protocol Data Units (PDUs) and/or one or more Service Data Unit (SDUs) according to the descriptions, functions, procedures, proposals, methods, and/or operational flow-charts disclosed in this document. The one or more processors 102 and 202 may generate messages, control information, data, or information according to the descriptions, functions, procedures, proposals, methods, and/or operational flowcharts disclosed in this document. The one or more processors 102 and 202 may generate signals (e.g., baseband signals) including PDUs, SDUs, messages, control information, data, or information according to the descriptions, functions, procedures, proposals, methods, and/or operational flowcharts disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, proposals, methods, and/or operational flowcharts disclosed in this document.

The one or more processors 102 and 202 may be referred to as controllers, microcontrollers, microprocessors, or microcomputers. The one or more processors 102 and 202 may be implemented by hardware, firmware, software, or a combination thereof. As an example, one or more Application Specific Integrated Circuits (ASICs), one or more Digital Signal Processors (DSPs), one or more Digital Signal Processing Devices (DSPDs), one or more Programmable Logic Devices (PLDs), or one or more Field Programmable Gate Arrays (FPGAs) may be included in the one or more processors 102 and 202. The descriptions, functions, procedures, proposals, methods, and/or operational flowcharts disclosed in this document may be implemented using firmware or software and the firmware or software may be configured to include the modules, procedures, or functions. Firmware or software configured to perform the descriptions, functions, procedures, proposals, methods, and/or operational flowcharts disclosed in this document may be included in the one or more processors 102 and 202 or stored in the one or more memories 104 and 204 so as to be driven by the one or more processors 102 and 202. The descriptions, functions, procedures, proposals, methods, and/or operational flowcharts disclosed in this document may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by Read-Only Memories (ROMs), Random Access Memories (RAMs), Electrically Erasable Programmable Read-Only Memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the methods and/or operational flowcharts of this document, to one or more other devices. The one or more transceivers 106 and 206 may receive user data, control information, and/or radio signals/channels, mentioned in the descriptions, functions, procedures, proposals, methods, and/or operational flowcharts disclosed in this document, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices. The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, proposals, methods, and/or operational flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received radio signals/channels etc. from RF band signals into baseband signals in order to process received user data, control information, radio signals/channels, etc. using the one or more processors 102 and 202. The one or more transceivers 106 and 206 may convert the user data, control information, radio signals/channels, etc. processed using the one or more processors 102 and 202 from the base band signals into the RF band signals. To this end, the one or more transceivers 106 and 206 may include (analog) oscillators and/or filters.

Figure 18:
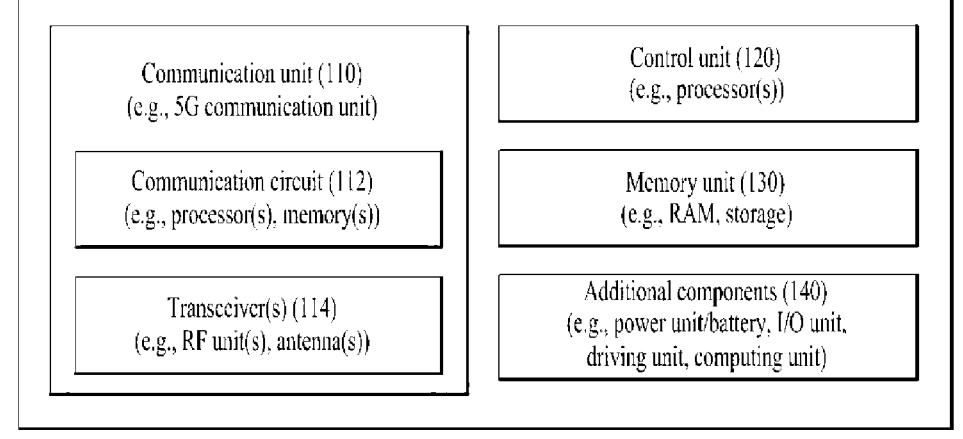
FIG. 18 illustrates another example of a wireless device to which the present disclosure is applied.

Examples of Application of Wireless Devices to which the Present Invention is Applied FIG. 18 illustrates another example of a wireless device applied to the present disclosure.

Referring to FIG. 18, wireless devices 100 and 200 may correspond to the wireless devices 100 and 200 of FIG. 17 and may be configured by various elements, components, units/portions, and/or modules. For example, each of the wireless devices 100 and 200 may include a communication unit 110, a control unit 120, a memory unit 130, and additional components 140. The communication unit may include a communication circuit 112 and transceiver(s) 114. For example, the communication circuit 112 may include the one or more processors 102 and 202 and/or the one or more memories 104 and 204 of FIG. 17. For example, the transceiver(s) 114 may include the one or more transceivers 106 and 206 and/or the one or more antennas 108 and 208 of FIG. 17. The control unit 120 is electrically connected to the communication unit 110, the memory 130, and the additional components 140 and controls overall operation of the wireless devices. For example, the control unit 120 may control an electric/mechanical operation of the wireless device based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of wireless devices. For example, the additional components 140 may include at least one of a power unit/battery, input/output (I/O) unit, a driving unit, and a computing unit. The wireless device may be implemented in the form of, without being limited to, the robot (100*a* of FIG. 16), the vehicles (100*b*-1 and 100*b*-2 of FIG. 16), the XR device (100*c* of FIG. 16), the hand-held device (100*d* of FIG. 16), the home appliance (100*e* of FIG. 16), the IoT device (100*f* of FIG. 16), a digital broadcast terminal, a hologram device, a public safety device, an MTC device, a medicine device, a fintech device (or a finance device), a security device, a climate/environment device, the AI server/device (400 of FIG. 16), the BSs (200 of FIG. 16), a network node, etc. The wireless device may be used in a mobile or fixed place according to a use-example/service.

In FIG. 18, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor, an Electronic Control Unit (ECU), a graphical processing unit, and a memory control processor. As another example, the memory 130 may be configured by a Random Access Memory (RAM), a Dynamic RAM (DRAM), a Read Only Memory (ROM)), a flash memory, a volatile memory, a non-volatile memory, and/or a combination thereof.

Here, wireless communication technologies implemented in the wireless devices (XXX, YYY) of the present specification may include LTE, NR, and 6G, as well as Narrowband Internet of Things for low power communication. At this time, for example, the NB-IoT technology may be an example of a Low Power Wide Area Network (LPWAN) technology and may be implemented in standards such as LTE Cat NB1 and/or LTE Cat NB2 and is not limited to the above-described names. Additionally or alternatively, the wireless communication technology implemented in the wireless devices (XXX, YYY) of the present specification may perform communication based on LTE-M technology. In this case, as an example, the LTE-M technology may be an example of LPWAN technology and may be referred to by various names such as eMTC (enhanced machine type communication). For example, LTE-M technology may be implemented in at least one of a variety of standards, such as 1) LTE CAT 0, 2) LTE Cat M1, 3) LTE Cat M2, 4) LTE non-BL (non-Bandwidth Limited), 5) LTE-MTC, 6) LTE Machine Type Communication, and/or 7) LTE M, and is not limited to the above-described names. Additionally or alternatively, the wireless communication technology implemented in the wireless devices (XXX, YYY) of the present specification is at least one of ZigBee, Bluetooth, and Low Power Wide Area Network (LPWAN) considering low power communication and is not limited to the above-described names. As an example, ZigBee technology can generate personal area networks (PANs) related to small/low-power digital communication based on various standards such as IEEE 802.15.4 and may be called various names.

The embodiments described above are those in which components and features of the present disclosure are combined in a predetermined form. Each component or feature should be considered optional unless explicitly stated otherwise. Each component or feature may be implemented in a form that is not combined with other components or features. In addition, it is also possible to constitute an embodiment of the present disclosure by combining some components and/or features. The order of operations described in the embodiments of the present disclosure may be changed. Some configurations or features of one embodiment may be included in other embodiments or may be replaced with corresponding configurations or features of other embodiments. It is obvious that the embodiments may be configured by combining claims that do not have an explicit citation relationship in the claims or may be included as new claims by amendment after filing.

In this document, embodiments of the present disclosure have been mainly described based on a signal transmission/reception relationship between a terminal and a base station. Such a transmission/reception relationship is extended in the same/similar manner to signal transmission/reception between a terminal and a relay or a base station and a relay. A specific operation described as being performed by a base station in this document may be performed by its upper node in some cases. That is, it is obvious that various operations performed for communication with a terminal in a network comprising a plurality of network nodes including a base station may be performed by the base station or network nodes other than the base station. The base station may be replaced by terms such as a fixed station, a Node B, an eNode B (eNB), an access point, and the like. In addition, the terminal may be replaced with terms such as User Equipment (UE), Mobile Station (MS), and Mobile Subscriber Station (MSS).

In a hardware configuration, the embodiments of the present disclosure may be achieved by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

In a firmware or software configuration, a method according to embodiments of the present disclosure may be implemented in the form of a module, a procedure, a function, etc. Software code may be stored in a memory unit and executed by a processor. The memory unit is located at the interior or exterior of the processor and may transmit and receive data to and from the processor via various known means As described before, a detailed description has been given of preferred embodiments of the present disclosure so that those skilled in the art may implement and perform the present disclosure. While reference has been made above to the preferred embodiments of the present disclosure, those skilled in the art will understand that various modifications and alterations may be made to the present disclosure within the scope of the present disclosure.

INDUSTRIAL APPLICABILITY

The above-described embodiments of the present disclosure are applicable to various mobile communication systems.

45

The invention claimed is:

1. A method by a user equipment (UE) comprising:

receiving configuration information related to a hybrid automatic repeat request (HARQ) feedback;

receiving a first downlink control channel including first downlink control information, wherein the first downlink control information includes scheduling information for a first downlink data channel and a first HARQ process number;

receiving a second downlink control channel including second downlink control information, wherein the second downlink control information includes scheduling information for a second downlink data channel and a second HARQ process number; and checking whether a HARQ out-of-order constraint is satisfied based on a first feedback timing for the first downlink data channel and a second feedback timing for the second downlink data channel, wherein, based on the configuration information including information disabling the HARQ feedback for the second HARQ process number, the second feedback timing related to the checking the HARQ out-of-order constraint is determined by a combination of a value of a new data indicator (NDI) field and a value of a redundancy version (RV) field included in the second downlink control information.

2. The method of claim 1, wherein based on the second feedback timing is earlier than the first feedback timing, the UE is configured to determine that scheduling of the first and the second downlink data channel is invalid.

3. The method of claim 1, wherein a time at which the first downlink data channel is scheduled is earlier than a time at which the second downlink data channel is scheduled.

4. The method of claim 1, wherein the first downlink control information and the second downlink control information schedule the first downlink data channel related to a non-terrestrial network (NTN) and the second downlink data channel related to the NTN, respectively.

5. A method of scheduling comprising:

transmitting configuration information related to a hybrid automatic repeat request (HARQ) feedback;

transmitting a first downlink control channel including first downlink control information, wherein the first downlink control information includes scheduling information for a first downlink data channel and a first HARQ process number; and transmitting a second downlink control channel including second downlink control information,

wherein the second downlink control information includes scheduling information for a second downlink data channel, and a second HARQ process number, wherein whether a HARQ out-of-order constraint is satisfied is checked based on a first feedback timing for the first downlink data channel and a second feedback timing for the second downlink data channel, and wherein, based on the configuration information including information disabling the HARQ feedback for the second HARQ process number, the second feedback timing is related to a checking of the HARQ out-of-order constraint and is determined by a combination of a value of a new data indicator (NDI) field and a value of a redundancy version (RV) field included in the second downlink control information.

6. A user equipment (UE) configured to evaluate effectiveness of a hybrid automatic repeat request (HARQ) process in a wireless communication system, the UE comprising:

a radio frequency (RF) transceiver; and a processor connected to the RF transceiver, wherein the processor is configured to:

control the RF transceiver to receive configuration information related to a hybrid automatic repeat request (HARQ) feedback;

control the RF transceiver to receive a first downlink control channel including first downlink control information, wherein the first downlink control information includes scheduling information for a first downlink data channel and a first HARQ process number;

control the RF transceiver to receive a second downlink control channel including second downlink control information, wherein the second downlink control information includes scheduling information for a second downlink data channel and a second HARQ process number; and check whether a HARQ out-of-order constraint is satisfied based on a first feedback timing for the first downlink data channel and a second feedback timing for the second downlink data channel, wherein, based on the configuration information including information disabling the HARQ feedback for the second HARQ process number, the second feedback timing related to the checking the HARQ out-of-order constraint is determined by a combination of a value of a new data indicator (NDI) field and a value of a redundancy version (RV) field included in the second downlink control information.

* * * * *